(12) United States Patent
Cottier et al.

(10) Patent No.: US 8,209,927 B2
(45) Date of Patent: Jul. 3, 2012

(54) STRUCTURAL FIBER CEMENT BUILDING MATERIALS

(75) Inventors: John Sydney Cottier, Oatley (AU); December Rose Cowen, Yucaipa, CA (US); Remi Dunoyer, Randwick (AU); Steven Duselis, Baulkham Hills (AU); James Albert Gleeson, North Curl Curl (AU); Amitabha Kumar, Claremont, CA (US)

(73) Assignee: James Hardie Technology Limited, Dublin (IE)

( * ) Notice: Subject to any disclaimer, the term of this patent is extended or adjusted under 35 U.S.C. 154(b) by 928 days.

(21) Appl. No.: 11/961,749

(22) Filed: Dec. 20, 2007

(65) Prior Publication Data

US 2009/0162602 A1    Jun. 25, 2009

(51) Int. Cl.
*E04C 1/00* (2006.01)
(52) U.S. Cl. .................. 52/309.3; 52/125.5
(58) Field of Classification Search .......... 52/309.3, 52/125.5; 428/192
See application file for complete search history.

(56) References Cited

U.S. PATENT DOCUMENTS

| | | |
|---|---|---|
| 815,801 A | 3/1906 | Depew et al. |
| 1,571,048 A | 1/1926 | Garrow |
| 1,914,163 A | 6/1933 | Randall |
| 2,156,308 A | 5/1939 | Schuh |
| 2,156,311 A | 5/1939 | Schuh |
| 2,175,568 A | 10/1939 | Haustein |
| 2,175,569 A | 10/1939 | Kennedy |
| 2,176,668 A | 10/1939 | Egeberg et al. |
| 2,377,484 A | 6/1945 | Elmendof |
| 2,676,892 A | 4/1954 | McLaughlin |
| 2,797,201 A | 6/1957 | Veatch |
| 2,978,340 A | 4/1961 | Veatch et al. |
| 2,987,408 A | 6/1961 | Minnick |
| 3,256,105 A | 6/1966 | Alford |
| 3,264,125 A | 8/1966 | Bourlin |
| 3,321,414 A | 5/1967 | Vieli |
| 3,360,392 A | 12/1967 | Mod et al. |
| 3,365,315 A | 1/1968 | Beck et al. |
| 3,501,324 A | 3/1970 | Kubo |
| 3,503,165 A * | 3/1970 | Hardt ........................ 52/125.5 |
| 3,679,446 A | 7/1972 | Kubo |
| 3,748,100 A | 7/1973 | Forseth |

(Continued)

FOREIGN PATENT DOCUMENTS

AR       206788 A1    8/1976

(Continued)

OTHER PUBLICATIONS

Skaggs, C.B. et al "Applications of Rheological Modifiers and Superplasticizers in Cementitious System" American Concrete Institute SP, (1994), SP-148, 189-207.

(Continued)

*Primary Examiner* — Basil Katcheves
(74) *Attorney, Agent, or Firm* — Knobbe, Martens, Olson & Bear, LLP

(57) ABSTRACT

A structural fiber cement sheet containing cementitious matrix and reinforcing cellulose fibers distributed throughout the matrix having a dry density less than 1.25 g/cm$^3$, a thickness less than 0.7500 in, and able to withstand uniform loads of 200 psf or greater according to test method of Section 6.4.2.4 of PS2 and with a deflection of less than 0.067 inches at 60 psf when spaced on a span of 24 inches or less on center.

7 Claims, 7 Drawing Sheets

U.S. PATENT DOCUMENTS

| | | |
|---|---|---|
| 3,748,160 A | 7/1973 | Carbajal |
| 3,752,685 A | 8/1973 | Honda et al. |
| 3,753,749 A | 8/1973 | Nutt |
| 3,782,985 A | 1/1974 | Gebhardt |
| 3,804,058 A | 4/1974 | Messenger |
| 3,836,412 A | 9/1974 | Boustany et al. |
| 3,838,998 A | 10/1974 | Matthews et al. |
| 3,843,380 A | 10/1974 | Beyn |
| 3,847,633 A | 11/1974 | Race |
| 3,865,779 A | 2/1975 | Oya et al. |
| 3,873,025 A | 3/1975 | Qvarnstrom |
| 3,873,475 A | 3/1975 | Pechacek et al. |
| 3,888,957 A | 6/1975 | Netting et al. |
| 3,902,911 A | 9/1975 | Messenger |
| 3,904,377 A | 9/1975 | Honda et al. |
| 3,909,283 A | 9/1975 | Warnke |
| 3,918,981 A | 11/1975 | Long |
| 3,931,069 A | 1/1976 | Lundin |
| 3,932,275 A | 1/1976 | Mewes et al. |
| 3,969,567 A | 7/1976 | Occleshaw et al. |
| 3,998,944 A | 12/1976 | Long |
| 4,003,752 A | 1/1977 | Isohata et al. |
| 4,009,135 A | 2/1977 | Harreus et al. |
| 4,013,480 A | 3/1977 | Chumbley et al. |
| 4,052,220 A | 10/1977 | Turpin, Jr. |
| 4,059,423 A | 11/1977 | De Vos |
| 4,066,723 A | 1/1978 | King et al. |
| 4,070,199 A | 1/1978 | Downing et al. |
| 4,088,804 A | 5/1978 | Cornwell et al. |
| 4,098,701 A | 7/1978 | Burrill et al. |
| 4,101,335 A | 7/1978 | Barrable |
| 4,102,697 A | 7/1978 | Fukuba et al. |
| 4,111,713 A | 9/1978 | Beck |
| 4,131,480 A | 12/1978 | McCurrich et al. |
| 4,131,638 A | 12/1978 | Whitaker et al. |
| 4,133,854 A | 1/1979 | Hendricks |
| 4,134,773 A | 1/1979 | Simeonov et al. |
| 4,138,313 A | 2/1979 | Hillstrom et al. |
| 4,144,121 A | 3/1979 | Otouma et al. |
| 4,166,749 A | 9/1979 | Sterrett et al. |
| 4,177,176 A | 12/1979 | Burrill et al. |
| 4,188,231 A | 2/1980 | Valore |
| 4,204,644 A | 5/1980 | Kozuka |
| 4,222,785 A | 9/1980 | Henderson |
| 4,225,383 A | 9/1980 | McReynolds |
| 4,234,344 A | 11/1980 | Tinsley et al. |
| 4,235,753 A | 11/1980 | Brown et al. |
| 4,235,836 A | 11/1980 | Wassell et al. |
| 4,240,840 A | 12/1980 | Downing et al. |
| 4,250,134 A | 2/1981 | Minnick |
| 4,252,193 A | 2/1981 | Powers et al. |
| 4,256,504 A | 3/1981 | Dunstan, Jr. |
| 4,256,584 A | 3/1981 | Lord et al. |
| 4,258,090 A | 3/1981 | Moraru |
| 4,261,286 A | 4/1981 | Kupfer |
| 4,265,674 A | 5/1981 | Debus et al. |
| 4,268,316 A | 5/1981 | Wills, Jr. |
| 4,268,317 A | 5/1981 | Rayl |
| 4,292,206 A | 9/1981 | Barnes, Jr. et al. |
| 4,298,413 A | 11/1981 | Teare |
| 4,303,732 A | 12/1981 | Torobin |
| 4,305,758 A | 12/1981 | Powers et al. |
| 4,307,142 A | 12/1981 | Blitstein et al. |
| 4,328,145 A | 5/1982 | Bobrowski et al. |
| 4,332,618 A | 6/1982 | Ballard |
| 4,336,338 A | 6/1982 | Downs et al. |
| 4,339,289 A | 7/1982 | Lankard |
| 4,340,407 A | 7/1982 | Anderson et al. |
| 4,344,804 A | 8/1982 | Bijen et al. |
| 4,362,566 A | 12/1982 | Hinterwaldner |
| 4,370,166 A | 1/1983 | Powers et al. |
| 4,373,955 A | 2/1983 | Bouchard et al. |
| 4,374,672 A | 2/1983 | Funston et al. |
| 4,379,729 A | 4/1983 | Cross |
| 4,383,960 A | 5/1983 | Delcoigne et al. |
| 4,388,257 A | 6/1983 | Oguri et al. |
| 4,394,175 A | 7/1983 | Cheriton et al. |
| 4,394,346 A | 7/1983 | Morooka |
| 4,403,006 A | 9/1983 | Bruce et al. |
| 4,406,703 A | 9/1983 | Guthrie et al. |
| 4,411,723 A | 10/1983 | Takeuchi |
| 4,411,847 A | 10/1983 | Netting et al. |
| 4,428,775 A | 1/1984 | Johnson et al. |
| 4,430,108 A | 2/1984 | Hojaji |
| 4,441,944 A | 4/1984 | Massey |
| 4,448,599 A | 5/1984 | Mackenzie et al. |
| 4,450,022 A | 5/1984 | Galer |
| 4,457,785 A | 7/1984 | Hsu et al. |
| 4,462,835 A | 7/1984 | Car |
| 4,475,936 A | 10/1984 | Aston et al. |
| 4,478,736 A | 10/1984 | Raba et al. |
| 4,495,301 A | 1/1985 | Sutor |
| 4,497,688 A | 2/1985 | Schaefer |
| 4,501,830 A | 2/1985 | Miller et al. |
| 4,504,320 A | 3/1985 | Rizer et al. |
| 4,504,335 A | 3/1985 | Galer |
| 4,507,154 A | 3/1985 | Burge et al. |
| 4,510,020 A | 4/1985 | Green et al. |
| 4,540,629 A | 9/1985 | Sands et al. |
| 4,548,676 A | 10/1985 | Johnstone et al. |
| 4,602,962 A | 7/1986 | Fehlmann |
| 4,623,390 A | 11/1986 | Delmonico |
| 4,624,798 A | 11/1986 | Gindrup et al. |
| 4,637,860 A | 1/1987 | Harper et al. |
| 4,637,990 A | 1/1987 | Torobin et al. |
| 4,643,920 A | 2/1987 | McEntee et al. |
| 4,647,505 A | 3/1987 | Blackie et al. |
| 4,647,509 A | 3/1987 | Wallace et al. |
| 4,647,589 A | 3/1987 | Valone |
| 4,657,810 A | 4/1987 | Douden |
| 4,659,386 A | 4/1987 | Nagai et al. |
| 4,659,679 A | 4/1987 | Falk |
| 4,661,137 A | 4/1987 | Garnier et al. |
| 4,670,079 A | 6/1987 | Thompson |
| 4,687,752 A | 8/1987 | Peters |
| 4,721,160 A | 1/1988 | Parcevaux et al. |
| 4,738,723 A | 4/1988 | Frizzell et al. |
| 4,746,364 A | 5/1988 | Kawai et al. |
| 4,759,802 A | 7/1988 | Ochi et al. |
| 4,767,491 A | 8/1988 | Vittone et al. |
| 4,767,726 A | 8/1988 | Marshall |
| 4,769,189 A | 9/1988 | Douden |
| 4,770,831 A | 9/1988 | Walker et al. |
| 4,772,328 A | 9/1988 | Pfeifer |
| 4,775,505 A | 10/1988 | Kuroda et al. |
| 4,780,141 A | 10/1988 | Double et al. |
| 4,816,091 A | 3/1989 | Miller et al. |
| 4,818,595 A | 4/1989 | Ellis |
| 4,826,788 A | 5/1989 | Dennert et al. |
| 4,837,069 A | 6/1989 | Bescup et al. |
| 4,840,672 A | 6/1989 | Baes |
| 4,840,688 A | 6/1989 | Vogt |
| 4,846,889 A | 7/1989 | Meyer |
| 4,867,931 A | 9/1989 | Cochran, Jr. |
| 4,871,495 A | 10/1989 | Helferich et al. |
| 4,904,503 A | 2/1990 | Hilton et al. |
| 4,915,740 A | 4/1990 | Sakai et al. |
| 4,933,013 A | 6/1990 | Sakai et al. |
| 4,933,031 A | 6/1990 | Blomberg et al. |
| 4,935,060 A | 6/1990 | Dingsoyr |
| 4,937,210 A | 6/1990 | Jones et al. |
| 4,938,958 A | 7/1990 | Niira et al. |
| 4,944,842 A | 7/1990 | Stromberg et al. |
| 4,946,505 A | 8/1990 | Jungk |
| 4,971,658 A | 11/1990 | Henricson et al. |
| 4,981,740 A | 1/1991 | Larsen |
| 4,983,550 A | 1/1991 | Goetz et al. |
| 4,985,119 A | 1/1991 | Vinson et al. |
| 4,994,113 A | 2/1991 | Helmstetter |
| 5,017,232 A | 5/1991 | Miceli |
| 5,021,093 A | 6/1991 | Beshay |
| 5,030,287 A | 7/1991 | Magnani |
| 5,030,289 A | 7/1991 | Sattler et al. |
| 5,032,548 A | 7/1991 | Lowe |
| 5,047,086 A | 9/1991 | Hayakawa et al. |
| 5,049,196 A | 9/1991 | Ries |
| 5,063,260 A | 11/1991 | Chen et al. |

| | | | | | |
|---|---|---|---|---|---|
| 5,069,702 A | 12/1991 | Block et al. | 5,580,378 A | 12/1996 | Shulman |
| 5,073,197 A | 12/1991 | Majumdar et al. | 5,580,508 A | 12/1996 | Kobayashi et al. |
| 5,102,596 A | 4/1992 | Lempfer et al. | 5,583,079 A | 12/1996 | Golitz et al. |
| 5,106,557 A | 4/1992 | Rirsch et al. | 5,591,684 A | 1/1997 | Kawachi et al. |
| 5,108,510 A | 4/1992 | Burge et al. | RE35,460 E | 2/1997 | Klungness et al. |
| 5,108,679 A | 4/1992 | Rirsch et al. | 5,603,758 A | 2/1997 | Schreifels, Jr. et al. |
| 5,112,405 A | 5/1992 | Sanchez | 5,631,097 A | 5/1997 | Anderson et al. |
| 5,114,617 A | 5/1992 | Smetana | 5,641,584 A | 6/1997 | Anderson et al. |
| 5,115,621 A | 5/1992 | Kobayashi | 5,643,359 A | 7/1997 | Souroushian et al. |
| 5,118,225 A | 6/1992 | Koch et al. | 5,648,144 A | 7/1997 | Maurer et al. |
| 5,128,114 A | 7/1992 | Schwartz | 5,658,624 A | 8/1997 | Anderson et al. |
| 5,143,780 A | 9/1992 | Balassa | 5,681,384 A | 10/1997 | Liskowitz et al. |
| 5,154,771 A | 10/1992 | Wada et al. | 5,693,137 A | 12/1997 | Styron |
| 5,164,003 A | 11/1992 | Bosco et al. | 5,718,758 A | 2/1998 | Breslauer |
| 5,167,710 A | 12/1992 | Leroux et al. | 5,718,759 A | 2/1998 | Stav et al. |
| 5,174,821 A | 12/1992 | Matsuoka et al. | 5,725,652 A | 3/1998 | Shulman |
| 5,176,732 A | 1/1993 | Block et al. | 5,728,458 A | 3/1998 | Sweeney |
| 5,191,456 A | 3/1993 | Sutherland et al. | 5,777,024 A | 7/1998 | Killilea |
| 5,192,366 A | 3/1993 | Nishioka et al. | 5,786,282 A | 7/1998 | Carter et al. |
| 5,194,334 A | 3/1993 | Uerdingen et al. | 5,795,515 A | 8/1998 | Fischer |
| 5,210,989 A | 5/1993 | Jakel | 5,804,003 A | 9/1998 | Nishizawa |
| 5,223,090 A | 6/1993 | Klungness et al. | 5,817,230 A | 10/1998 | Groppo et al. |
| 5,229,437 A | 7/1993 | Knight | 5,820,668 A | 10/1998 | Comrie |
| 5,234,754 A | 8/1993 | Bache | 5,849,055 A | 12/1998 | Arai et al. |
| 5,236,773 A | 8/1993 | Sorathia et al. | 5,853,475 A | 12/1998 | Liskowitz et al. |
| 5,236,994 A | 8/1993 | Markusch et al. | 5,858,083 A | 1/1999 | Stav et al. |
| 5,252,526 A | 10/1993 | Whittemore | 5,863,477 A | 1/1999 | Kawai |
| 5,254,228 A | 10/1993 | Westhof et al. | 5,871,824 A | 2/1999 | Bates |
| 5,259,872 A | 11/1993 | Shinozaki et al. | 5,876,561 A | 3/1999 | Tsai |
| 5,290,355 A | 3/1994 | Jakel | 5,888,322 A | 3/1999 | Holland |
| 5,294,255 A | 3/1994 | Smetana et al. | 5,891,374 A | 4/1999 | Shah et al. |
| 5,314,119 A | 5/1994 | Watt | 5,895,768 A | 4/1999 | Speit |
| 5,319,245 A | 6/1994 | Chen et al. | 5,897,701 A | 4/1999 | Soroushian et al. |
| 5,323,581 A | 6/1994 | Jakel | 5,899,256 A | 5/1999 | Rohatgi |
| 5,338,357 A | 8/1994 | Takai et al. | 5,900,053 A | 5/1999 | Brothers et al. |
| 5,342,485 A | 8/1994 | Armbrust, Jr. | 5,935,699 A | 8/1999 | Barber |
| 5,346,012 A | 9/1994 | Heathman et al. | 5,967,211 A | 10/1999 | Lucas et al. |
| 5,346,541 A | 9/1994 | Goldman et al. | 5,968,257 A | 10/1999 | Ahrens |
| 5,352,288 A | 10/1994 | Mallow | 5,989,335 A | 11/1999 | Souroushian et al. |
| 5,352,290 A | 10/1994 | Takeshita et al. | 5,997,630 A | 12/1999 | Angelskar et al. |
| 5,358,676 A | 10/1994 | Jennings et al. | 5,997,632 A | 12/1999 | Styron |
| 5,366,637 A | 11/1994 | Turunc | 6,008,275 A | 12/1999 | Moreau et al. |
| 5,383,521 A | 1/1995 | Onan et al. | 6,030,447 A | 2/2000 | Naji et al. |
| 5,384,345 A | 1/1995 | Naton | 6,034,155 A | 3/2000 | Espeland et al. |
| 5,385,764 A | 1/1995 | Andersen et al. | 6,045,057 A | 4/2000 | Moor et al. |
| 5,387,282 A | 2/1995 | Jakel | 6,048,593 A | 4/2000 | Espeland et al. |
| 5,387,283 A | 2/1995 | Kirkpatrick et al. | 6,086,998 A | 7/2000 | Wihsmann |
| 5,387,626 A | 2/1995 | Bohme-Kovac et al. | 6,138,430 A | 10/2000 | Van Acoleyen et al. |
| 5,391,245 A | 2/1995 | Turner | 6,143,069 A | 11/2000 | Brothers et al. |
| 5,403,392 A | 4/1995 | Craig | 6,204,214 B1 | 3/2001 | Singh et al. |
| 5,403,394 A | 4/1995 | Burgand | 6,207,077 B1 | 3/2001 | Burnell-Jones |
| 5,405,498 A | 4/1995 | Pease | 6,228,215 B1 | 5/2001 | Hoffman, Jr. |
| 5,407,983 A | 4/1995 | Naton | 6,254,845 B1 | 7/2001 | Ohashi et al. |
| 5,415,734 A | 5/1995 | Backlund et al. | 6,277,189 B1 | 8/2001 | Chugh |
| 5,421,867 A | 6/1995 | Yeager et al. | 6,290,769 B1 | 9/2001 | Carkner |
| 5,429,717 A | 7/1995 | Bokstrom et al. | 6,325,853 B1 | 12/2001 | Hogan et al. |
| 5,432,212 A | 7/1995 | Honda et al. | 6,332,921 B1 | 12/2001 | Brothers et al. |
| 5,432,215 A | 7/1995 | Girg et al. | 6,344,654 B1 | 2/2002 | Lesko |
| 5,439,518 A | 8/1995 | Francis et al. | 6,346,146 B1 | 2/2002 | Duselis et al. |
| 5,443,603 A | 8/1995 | Kirkendall | 6,352,952 B1 | 3/2002 | Jardine et al. |
| 5,453,123 A | 9/1995 | Burge et al. | 6,375,853 B1 | 4/2002 | Yoon |
| 5,453,310 A | 9/1995 | Andersen et al. | 6,387,175 B1 | 5/2002 | Lynn et al. |
| 5,458,973 A | 10/1995 | Jeffs | 6,419,788 B1 | 7/2002 | Wingerson |
| 5,465,547 A | 11/1995 | Jakel | 6,444,162 B1 | 9/2002 | Anshits et al. |
| 5,470,383 A | 11/1995 | Schermann et al. | 6,461,988 B2 | 10/2002 | Budd et al. |
| 5,472,486 A | 12/1995 | Dragner et al. | 6,475,275 B1 | 11/2002 | Nebesnak et al. |
| 5,482,550 A | 1/1996 | Strait | 6,482,258 B2 | 11/2002 | Styron |
| 5,482,551 A | 1/1996 | Morris et al. | 6,485,561 B1 | 11/2002 | Dattel |
| 5,484,480 A | 1/1996 | Styron | 6,506,248 B1 | 1/2003 | Duselis et al. |
| 5,490,889 A | 2/1996 | Kirkpatrick et al. | 6,506,819 B1 | 1/2003 | Shukla et al. |
| 5,508,072 A | 4/1996 | Andersen et al. | 6,528,151 B1 | 3/2003 | Shah et al. |
| 5,520,779 A | 5/1996 | Bold | 6,531,222 B1 | 3/2003 | Tanaka et al. |
| 5,534,348 A | 7/1996 | Miller et al. | 6,533,848 B1 | 3/2003 | Robl et al. |
| 5,536,310 A | 7/1996 | Brook et al. | 6,562,743 B1 | 5/2003 | Cook et al. |
| 5,547,505 A | 8/1996 | Nakatsu et al. | 6,572,697 B2 | 6/2003 | Gleeson et al. |
| 5,556,458 A | 9/1996 | Brook et al. | 6,605,148 B2 | 8/2003 | Shirakawa et al. |
| 5,558,710 A | 9/1996 | Baig | 6,620,487 B1 | 9/2003 | Tonyan et al. |
| 5,562,832 A | 10/1996 | McOnie et al. | 6,626,991 B1 | 9/2003 | Drochon et al. |
| 5,577,024 A | 11/1996 | Malkamaki et al. | 6,641,658 B1 | 11/2003 | Dubey |

| Patent No. | Date | Inventor |
|---|---|---|
| 6,645,289 B2 | 11/2003 | Sobolev et al. |
| 6,648,961 B2 | 11/2003 | Brothers et al. |
| 6,656,265 B1 | 12/2003 | Garnier et al. |
| 6,660,077 B2 | 12/2003 | De Buen-Unna et al. |
| 6,660,078 B2 | 12/2003 | Brothers et al. |
| 6,676,744 B2 | 1/2004 | Merkley et al. |
| 6,676,745 B2 | 1/2004 | Merkley et al. |
| 6,682,595 B1 | 1/2004 | Barbour |
| 6,692,564 B2 | 2/2004 | Hofmann |
| 6,692,570 B2 | 2/2004 | Cottier et al. |
| 6,719,878 B1 | 4/2004 | Svedman |
| 6,749,897 B2 | 6/2004 | Naji et al. |
| 6,770,576 B2 | 8/2004 | Cook et al. |
| 6,777,103 B2 | 8/2004 | Merkley et al. |
| 6,811,603 B2 | 11/2004 | Brothers et al. |
| 6,814,798 B2 | 11/2004 | Vijn et al. |
| 6,824,605 B2 | 11/2004 | De Buen-Unna et al. |
| 6,824,715 B2 | 11/2004 | Cottier et al. |
| 6,837,452 B2 | 1/2005 | Dezutter et al. |
| 6,872,246 B2 | 3/2005 | Merkley et al. |
| 6,893,751 B2 | 5/2005 | Naji et al. |
| 6,933,038 B2 | 8/2005 | Nanko et al. |
| 6,942,726 B2 | 9/2005 | Cook et al. |
| 7,028,436 B2 | 4/2006 | Bezubic, Jr. |
| 2001/0043996 A1 | 11/2001 | Yamada et al. |
| 2002/0004111 A1 | 1/2002 | Matsubara et al. |
| 2002/0007926 A1 | 1/2002 | Jewell et al. |
| 2002/0007927 A1 | 1/2002 | Vahatalo et al. |
| 2002/0025436 A1 | 2/2002 | Meyer |
| 2002/0051892 A1 | 5/2002 | Laks et al. |
| 2002/0069791 A1 | 6/2002 | Merkley et al. |
| 2002/0112827 A1 | 8/2002 | Merkley et al. |
| 2002/0121229 A1 | 9/2002 | Jardine et al. |
| 2002/0170466 A1 | 11/2002 | Naji et al. |
| 2002/0170467 A1 | 11/2002 | Naji et al. |
| 2002/0170468 A1 | 11/2002 | Luo et al. |
| 2002/0175126 A1 | 11/2002 | Naji et al. |
| 2002/0179219 A1 | 12/2002 | Naji et al. |
| 2002/0189499 A1 | 12/2002 | Naji et al. |
| 2002/0189500 A1 | 12/2002 | Naji et al. |
| 2002/0192510 A1 | 12/2002 | Naji et al. |
| 2003/0000424 A1 | 1/2003 | Naji et al. |
| 2003/0164119 A1 | 9/2003 | Naji et al. |
| 2003/0177955 A1 | 9/2003 | Vijn et al. |
| 2003/0205172 A1 | 11/2003 | Gleeson et al. |
| 2003/0213568 A1 | 11/2003 | Wester et al. |
| 2003/0213569 A1 | 11/2003 | Wester et al. |
| 2003/0213570 A1 | 11/2003 | Vrbanac et al. |
| 2003/0213572 A1 | 11/2003 | Vrbanac et al. |
| 2004/0043217 A1 | 3/2004 | Dezutter et al. |
| 2004/0043686 A1 | 3/2004 | Batdorf |
| 2004/0079260 A1 | 4/2004 | Datta et al. |
| 2004/0080063 A1 | 4/2004 | Datta et al. |
| 2004/0081827 A1 | 4/2004 | Datta et al. |
| 2004/0083677 A1 | 5/2004 | Bezubic, Jr. |
| 2004/0132843 A1 | 7/2004 | Baumgart et al. |
| 2004/0145078 A1 | 7/2004 | Merkley et al. |
| 2004/0168615 A1 | 9/2004 | Luo et al. |
| 2004/0211342 A1 | 10/2004 | Sprouts et al. |
| 2004/0262801 A1 | 12/2004 | Hojaji et al. |
| 2005/0005821 A1 | 1/2005 | Colombet et al. |
| 2005/0011412 A1 | 1/2005 | Vijn et al. |
| 2005/0016423 A1 | 1/2005 | Merkley et al. |
| 2005/0045067 A1 | 3/2005 | Naji et al. |
| 2005/0126430 A1 | 6/2005 | Lightner, Jr. et al. |
| 2005/0208287 A1 | 9/2005 | Naji et al. |
| 2005/0235883 A1 | 10/2005 | Merkley et al. |
| 2006/0147681 A1* | 7/2006 | Dubey ............ 428/192 |
| 2007/0077436 A1 | 4/2007 | Naji et al. |

FOREIGN PATENT DOCUMENTS

| | | |
|---|---|---|
| AR | 206890 | 8/1976 |
| AR | 227376 | 10/1982 |
| AR | 228671 A1 | 3/1983 |
| AR | 291988 | 1/1984 |
| AR | 151553 | 10/1986 |
| AR | 0029198 | 6/2003 |
| AT | 391131 B | 8/1990 |
| AU | 515151 | 3/1981 |
| AU | 44948/85 | 1/1986 |
| AU | 0552930 B2 | 6/1986 |
| AU | 55929/86 | 10/1986 |
| AU | 572111 | 5/1988 |
| AU | 606344 | 1/1989 |
| AU | 13067/92 | 9/1992 |
| AU | 659400 | 5/1995 |
| AU | 734095 | 3/1999 |
| CA | 1040859 | 10/1978 |
| CA | 1177205 | 11/1984 |
| CL | 32972 | 2/1980 |
| CN | 1032332 A | 4/1989 |
| CN | 1081168 | 1/1994 |
| CN | 1087885 | 6/1994 |
| CN | 1099089 A | 2/1995 |
| CN | 1160070 | 9/1997 |
| CN | 1178202 | 4/1998 |
| CN | 1199116 | 11/1998 |
| CN | 1224701 A | 8/1999 |
| CN | 1251358 | 4/2000 |
| CN | 1061328 | 1/2001 |
| CN | 1500038 A | 5/2004 |
| CS | 222361 | 8/1985 |
| CZ | 283459 | 4/1998 |
| DE | 2344773 | 3/1975 |
| DE | 143936 | 9/1980 |
| DE | 3213521 A1 | 6/1983 |
| DE | 3314796 A1 | 10/1984 |
| DE | 3324671 A1 | 1/1985 |
| DE | 3601736 A1 | 1/1986 |
| DE | 3711549 A1 | 10/1987 |
| DE | 3743467 A1 | 7/1989 |
| DE | 3908172 A1 | 9/1990 |
| DE | 4229572 A1 | 3/1993 |
| DE | 4316666 C1 | 12/1994 |
| DE | 19607081 A1 | 8/1997 |
| DE | 19654836 | 6/1998 |
| DE | 19858342 C1 | 8/2000 |
| DE | 19962137 A1 | 6/2001 |
| EP | 0007585 B1 | 7/1979 |
| EP | 0021362 A1 | 1/1981 |
| EP | 0069095 A1 | 6/1982 |
| EP | 0056263 A1 | 7/1982 |
| EP | 0102092 A1 | 3/1984 |
| EP | 0287962 A1 | 4/1987 |
| EP | 0222339 A1 | 5/1987 |
| EP | 0242872 A1 | 10/1987 |
| EP | 0314242 A1 | 5/1989 |
| EP | 0327351 A2 | 8/1989 |
| EP | 0328431 A1 | 8/1989 |
| EP | 0376334 A2 | 7/1990 |
| EP | 0263723 A2 | 2/1991 |
| EP | 0484283 A1 | 6/1992 |
| EP | 0619227 B1 | 10/1994 |
| EP | 0619277 B1 | 10/1994 |
| EP | 0359362 B1 | 4/1995 |
| EP | 0147429 A1 | 7/1995 |
| EP | 0725044 A1 | 8/1996 |
| EP | 0803484 A1 | 10/1997 |
| EP | 0846666 B1 | 6/1998 |
| EP | 0846668 B1 | 6/1998 |
| EP | 0678488 B1 | 9/1998 |
| EP | 0891954 B1 | 1/1999 |
| EP | 0931778 B1 | 7/1999 |
| EP | 0999232 B1 | 5/2000 |
| EP | 0801037 B1 | 8/2000 |
| EP | 1106236 B1 | 6/2001 |
| EP | 1156021 A1 | 11/2001 |
| EP | 1160212 A1 | 12/2001 |
| EP | 1172341 A1 | 1/2002 |
| EP | 1346964 A2 | 9/2003 |
| EP | 1334076 B1 | 8/2006 |
| FR | 895184 | 3/1944 |
| FR | 1557348 | 2/1969 |
| FR | 2512440 | 3/1983 |
| FR | 2611432 | 9/1988 |
| GB | 22139 | 0/1901 |
| GB | 442098 | 2/1936 |
| GB | 449384 | 6/1936 |

| | | | | | | |
|---|---|---|---|---|---|---|
| GB | 682432 | 11/1952 | | JP | 04300232 | 10/1992 |
| GB | 731597 | 6/1955 | | JP | 04349155 | 12/1992 |
| GB | 743866 | 1/1956 | | JP | 5154816 | 6/1993 |
| GB | 744070 | 2/1956 | | JP | 5-186261 | 7/1993 |
| GB | 752345 | 7/1956 | | JP | 5177625 | 7/1993 |
| GB | 896910 | 5/1962 | | JP | 05184246 | 7/1993 |
| GB | 1003850 | 8/1963 | | JP | 06127992 | 5/1994 |
| GB | 1062410 | 3/1967 | | JP | 06144912 | 5/1994 |
| GB | 1258288 | 12/1971 | | JP | 06256053 | 9/1994 |
| GB | 1265471 | 3/1972 | | JP | 06258053 | 9/1994 |
| GB | 1448320 | 9/1976 | | JP | 6271371 | 9/1994 |
| GB | 1490711 | 11/1977 | | JP | 07024299 | 1/1995 |
| GB | 1514239 | 6/1978 | | JP | 07041592 | 2/1995 |
| GB | 1515521 | 6/1978 | | JP | 07165455 | 6/1995 |
| GB | 1536663 | 12/1978 | | JP | 07187734 | 7/1995 |
| GB | 2041384 | 9/1980 | | JP | 07196348 | 8/1995 |
| GB | 1604910 | 12/1981 | | JP | 07292846 | 11/1995 |
| GB | 2106527 | 4/1983 | | JP | 07315869 | 12/1995 |
| GB | 2137977 | 10/1984 | | JP | 08012450 | 1/1996 |
| GB | 2230772 A | 10/1990 | | JP | 08067541 | 3/1996 |
| GB | 2276875 A | 10/1995 | | JP | 08073283 | 3/1996 |
| GB | 2307425 A | 5/1997 | | JP | 08119708 | 5/1996 |
| GB | 2330138 A | 4/1999 | | JP | 08169779 | 7/1996 |
| HU | 164419 | 2/1974 | | JP | 08217561 | 8/1996 |
| HU | 173947 | 9/1979 | | JP | 09020526 | 1/1997 |
| HU | 180773 | 4/1983 | | JP | 09052747 | 2/1997 |
| HU | 31027 | 4/1984 | | JP | 09077543 | 3/1997 |
| HU | 200511 B | 9/1986 | | JP | 9092895 | 4/1997 |
| HU | 0895285 | 1/1990 | | JP | 9124327 | 5/1997 |
| HU | 209836 B | 7/1990 | | JP | 09201561 | 8/1997 |
| HU | 9602843 | 12/1996 | | JP | 59217659 | 8/1997 |
| HU | 0001904 | 11/2000 | | JP | 9227200 | 9/1997 |
| IT | 1311962 | 3/2002 | | JP | 09255383 | 9/1997 |
| JP | 54-25927 | 2/1954 | | JP | 10036161 | 2/1998 |
| JP | 75095319 | 7/1975 | | JP | 10095922 | 4/1998 |
| JP | 55085756 | 6/1980 | | JP | 11010631 | 1/1999 |
| JP | 55095654 | 7/1980 | | JP | 11139859 | 5/1999 |
| JP | 55130847 | 10/1980 | | JP | 2000119050 | 4/2000 |
| JP | 56014466 | 2/1981 | | JP | 2000143307 | 5/2000 |
| JP | 57017452 | 1/1982 | | JP | 2000302498 | 10/2000 |
| JP | 57156361 | 9/1982 | | JP | 2000302522 | 10/2000 |
| JP | 57183344 | 11/1982 | | JP | 2001163647 | 6/2001 |
| JP | 58000351 | 1/1983 | | JP | 2001240439 | 9/2001 |
| JP | 58055034 | 4/1983 | | JP | 2001240458 | 9/2001 |
| JP | 58149939 | 9/1983 | | JP | 2001316157 | 11/2001 |
| JP | 59045953 | 3/1984 | | JP | 2001316163 | 11/2001 |
| JP | 59107985 | 6/1984 | | JP | 2002003248 | 1/2002 |
| JP | 9-217659 | 12/1984 | | JP | 2002053361 | 2/2002 |
| JP | 60135211 | 7/1985 | | JP | 2003335560 | 11/2003 |
| JP | 60161381 | 8/1985 | | JP | 2005034695 | 2/2005 |
| JP | 60191074 | 9/1985 | | KR | 9508587 | 8/1995 |
| JP | 61019900 | 1/1986 | | KR | 1019950008587 | 8/1995 |
| JP | 61141656 | 6/1986 | | KR | 2000014685 | 3/2000 |
| JP | 88052740 | 6/1986 | | KR | 2001053808 | 7/2001 |
| JP | 61178462 | 8/1986 | | NO | 9901129 | 11/2000 |
| JP | 62036055 | 2/1987 | | PL | 154782 | 12/1991 |
| JP | 62036056 | 2/1987 | | PL | 190627 | 12/1997 |
| JP | 62207751 | 9/1987 | | RU | 2161695 | 1/2001 |
| JP | 62235274 | 10/1987 | | RU | 2167485 | 5/2001 |
| JP | 63008248 | 1/1988 | | RU | 2168485 | 6/2001 |
| JP | 6330381 | 2/1988 | | RU | 2243189 | 12/2004 |
| JP | 63248751 | 10/1988 | | SU | 240472 | 3/1969 |
| JP | 63257631 | 10/1988 | | SU | 411054 | 1/1974 |
| JP | 64-29843 | 1/1989 | | SU | 1571024 | 6/1990 |
| JP | 64-37478 | 2/1989 | | SU | 1650196 | 5/1991 |
| JP | 01141849 | 6/1989 | | TW | 408089 | 10/2000 |
| JP | 92052746 | 4/1990 | | WO | WO 84/04765 | 12/1984 |
| JP | 92054171 | 4/1990 | | WO | WO 85/00361 | 1/1985 |
| JP | 02192447 | 7/1990 | | WO | WO 86/00291 | 1/1986 |
| JP | 02283646 | 11/1990 | | WO | WO 91/01409 | 2/1991 |
| JP | 02289456 | 11/1990 | | WO | WO 92/00251 | 1/1992 |
| JP | 03016978 | 1/1991 | | WO | WO 92/10440 | 6/1992 |
| JP | 04295072 | 3/1991 | | WO | WO 96/07538 | 3/1996 |
| JP | 03295843 | 12/1991 | | WO | WO 96/17996 | 6/1996 |
| JP | 04002642 | 1/1992 | | WO | WO 96/40598 | 12/1996 |
| JP | 04089340 | 3/1992 | | WO | WO 97/08111 | 3/1997 |
| JP | 04144949 | 5/1992 | | WO | WO 97/21640 | 6/1997 |
| JP | 4-182333 | 6/1992 | | WO | WO 97/27152 | 7/1997 |
| JP | 04182335 | 6/1992 | | WO | WO 97/31153 | 8/1997 |

| WO | WO 98/03284 | 1/1998 |
| WO | WO 98/27027 | 6/1998 |
| WO | WO 98/29353 | 7/1998 |
| WO | WO 99/08885 | 2/1999 |
| WO | WO 99/35330 | 7/1999 |
| WO | WO 00/21901 | 4/2000 |
| WO | WO 00/48960 | 8/2000 |
| WO | WO 00/71336 | 11/2000 |
| WO | WO 01/16048 | 3/2001 |
| WO | WO 01/30927 | 5/2001 |
| WO | WO 0151427 | 7/2001 |
| WO | WO 01/72863 | 10/2001 |
| WO | WO 01/81666 | 11/2001 |
| WO | WO 02/12623 | 2/2002 |
| WO | WO 02/18486 | 3/2002 |
| WO | WO 02/28795 | 4/2002 |
| WO | WO 02/28796 | 4/2002 |
| WO | WO 02/33164 | 4/2002 |
| WO | WO 02/070218 | 9/2002 |
| WO | WO 02/070247 | 9/2002 |
| WO | WO 02/070421 | 9/2002 |
| WO | WO 2004/018090 | 3/2004 |
| WO | WO 2004/063113 | 7/2004 |
| WO | WO 2004/101137 | 11/2004 |

OTHER PUBLICATIONS

Gehm, Harry W. "New and Basic Research Approaches to Liquid Effluent Treatment" Paper Trade Journal (1958), 142 (No. 16), 40-4, 46.

Benitez, et al. "Optimization Technique for Sewage Sludge Conditioning with Polymer and Skeleton Builders" Water Research (1994), 28(10), 2067-73.

Blankenburg et al. "Quality and Possible Use of Brown Coal Fly Ash of East Germany" Freiberger Forschungshefte C (1986), C413, 102-14.

Xu, L. et al. "Study on Particle Size Distribution and Chemical Activity of Mechanical Activated Fly Ash" Guisuanyan Tongbao (2003), 22(2), 73-76.

"Self-Leveling Elastic Waterproofing Coating," Shangai Building Materials, Issue 6, 2000, 5 pgs.

Sevcik, V., XP002389199, "Mixture for Refractory Purposes" Database EPODOC, European Patent Office, The Hague, NL; (Oct. 15, 1997); CZ283459.

Chemical Abstracts, vol. 103, No. 22, Abstract No. 182776h, CS222361 "Mixture for Autoclaved Lime-Silica Concrete." Dec. 2, 1985, p. 299.

Chemical Abstracts, vol. 84, No. 16, Abstract No. 110612t, JP 7595319, "High-strength, Extrusion-Molded, Lightweight Calcium Silicate Product" Apr. 19, 1976, p. 333. (XP 000189097).

Chemical Abstracts, vol. 95, No. 2, Abstract No. 11663f, JP 8114466, "High-Strength Calcium Silicate Products" Jul. 13, 1981, p. 285 (XP 000187478).

Bessey, "Hydrated Calcium Silicate Products Other Than Hydraulic Cements"—The Chemistry of.Cements, edited by H.F.W. Taylor, vol. 2, p. 101-133, Academic Press.

Crennan et al. "Autoclaved Lime-Quartz Materials" Cement and Concrete Research, vol. 7, pp. 493-502, 1977.

Abo-El-Enein, et al. "Autoclaved Calcium Silicate Hydrates. I—Rate of Formation and Molar Composition," II Cemento Mar. 1990, pp. 147-160.

Isu et al. "Influence of Quartz Particle Size on the Chemical and Mechanical Properties of Autoclaved Aerated Concrete" Cement & Concrete Research, vol. 25, No. 2, pp. 243-248, 1995.

Arai et al. "Crystal Shape and Size Controls of Xonotlite" Gypsum and Lime, No. 248, pp. 17-25, 1994.

CRC Handbook of Chemistry and Physics, $62^{nd}$ ed., p. F-124.

Aitken, et al. "Hydrothermal Reactions in Lime-Quartz Pastes" J. Appl. Chem., pp. 7-15, Jan. 10, 1960.

Assarsson, "Hydrothermal Reactions Between Calcium Hydroxide and Muscovite and Feldspar at 120-220°" J. Phys. Chem. 64 (1960) pp. 626-632.

Chan, et al. "Formation of 11 A Tobermorite from Mixtures of Lime and Collidal Silica with Quartz" Cem. Concr. Res., 8 (1978) 135-138.

Kondo "Kinetic Study on Hydrothermal Reaction Between Lime and Silica" Autoclaves Calcium Silicate Building Products, London, 1965, pp. 92-100 (1967).

Kondo, et al. "Kinetics and Mechanism of Hydrothermal reaction in Lime-Quartz-Water System" J. Ceram. Soc. Japan, 84 (1976) 573-578.

Celite Material Safety Data Sheet (MSDS)—revised date: Jul. 10, 1992.

Kennedy George C., Econ. Geol. 45 [7] 652 (1950).

Technical File by Louisiana-Pacific Samoa, Inc. sent to Redco on May 5, 1999. (4 pgs).

Declaration by a Representative of the company Weyerhaeuser (Bill Adams), and bills dated prior to Oct. 17, 1999.

Campbell, et al. "Wood Fibre-Reinforced Cement Composites" Journal of Materials Science, 15 (1980) pp. 1962-1970.

Coutts, "From Forest to Factory to Fabrication" in Fibre Reinforced Cement and Concrete, 1992 ed. R.N. Swamy, E & FN SPON, London, pp. 31-47.

Extract from Webster's Third New International Dictionary of the English Language unabridged, ed. Merriam-Webster Inc., Springfield, p. 1840 (1986).

Woods, "Keeping a Lid on It: Asbestos-Cement Building Materials" Aug. 2000 (12 pgs) internet article located at: www.cr.nps.gov/hps/tps/recentpast/asbestosarticle.htm.

Chapter 5 "Asbestos Cement Products" pp. 25-40 (book / date unknown).

Chemical Abstracts on STN "Plasticizing Effect of Aliphatic Amines on Cements" Babachev et al., Build Sci Inst. Sofia Bulgaria; Epitoanyag (1972) 24(11), 430-5.

Chemical Abstracts, vol. 94, No. 8, "Building Materials with Improved Black Mold Resistance" JP 8085756, Columbus, Ohio; Abstract No. 51915a; Feb. 23, 1981, (XP 000186251).

Chemical Abstracts, vol. 104, No. 14, "Lightweight Cement Moldings" JP 60161381, Columbus, OH, Abstract No. 114971p, Apr. 7, 1986 (XP 000183799).

Hawley's Condensed Chemical Dictionary, Richard Lewis Sr., Twelfth Ed., 1993 Van Nostrand Reinhold, p. 435, definition of "dispersing agent."

Shapiro, et al. "Manufacture of Board Resistant to Biological Degradation" Bumazhnaya Promyshiennost 36(No. 7) (1961) (XP-002335287).

Database WPI Section Ch, Week 198610 Derwent Publications Ltd., London, GB; AN 1986-066741; JP61019900 (XP-002335289).

XP-002197953 & JP2001240458, Kamishima Kagaku Kogyo KK, Database WPI, Section Ch, Week 200212, Derwent Publications Ltd., London, GB; AN 2002-085436, Sep. 4, 1001.

Finnish Forest Industries Federal "Mechanical Pulp Production" internet article located at http://english.forestindustries.fi/products/pulp/mechanical.html. dated Nov. 10, 2004 (2 pgs).

Ekman et al. "Studies on the Behavior of Extractives in Mechanical Pulp Suspensions" Nordic Pulp Paper Res. J. 2, No. 5: (abstract); Jun. 1990 (XP-002194276).

Ekman et al. "Studies on the Behavior of Extractives in Mechanical Pulp Suspensions" Nordic Pulp and.Paper Research Journal No. 2 (1990), pp. 96-103.

Soroushian, "Development of Specialty Cellulose Fibers and Cementitious Matrices for Cellelose Fiber Reinforced Cement Composites" pp. 1-38 (undated).

Lin et al. "Improvements in the Durability of Cellulose Reinforced Cementitious Composites" Mechanisms of Chemical Degradation of Cement-Bsed Systems, Proceedings of the Materials Research Society's Symposium on Mechanisms of Chemical Degradation of Cement-Based Systems, Boston, Nov. 27-30, 1995 (1997).

Neithalath, et al. "Acoustic Performance and Damping Behavior of Cellulose-Cement Composites" Cement & Concrete Composites 25 (2003) , pp. 1-12.

Mai et al. "Effects of Water and Bleaching on the Mechanical Properties of Cellulose Fiber Cements" Journal of Materials Science 18 (1983) pp. 2156-2162 (w/attached abstract).

Mai et al. "Slow Crack Growth in Bleached Cellulose Fibre Cements" Journal of Mat'ls Science Letters 3 (1984) pp. 127-130 (w/attached abstract).

Jubocid "Special Anti-Mildew Coatings" Technical Sheet 10, Sep. 2002 (4 pgs).

Thai MDF Board Co., Ltd "Beger Synotex Acrylic TM 100% Emulsion Paint" (2 pgs); 2003 internet article located at: http://www.thaimdfcom/paint_roofpaint.htm.

"Hardi-Plank and Surface Mold" internet article locate at: http://www.nefsi.org/wwwboard/messages/439.html; Jun. 13, 2003 (2 pgs).

Force 10 Caribbean "Custom Features" Engineered Building Systems (1999) 5 pgs.

Chemical Abstracts, vol. 117, No. 6, Abstract 54763d, "Aluminum hydroxide-containing cement compositions for extrusion" (JP 0489340), American Chemical Society, Columbus, OH Aug. 10, 1992, p. 390.

Chemical Abstracts, vol. 90, No. 16, American Chemical Society, Columbus, OH, Apr. 16, 1979, p. 303.

Chemical Abstracts, vol. 95, No. 16, American Chemical Society, Columbus, OH, Oct. 19, 1981, p. 288.

Chemical Abstracts, vol. 86, No. 18, American Chemical Society, Columbus, Oh, May 2, 1977, p. 303.

Chemical Abstracts, vol. 95, No. 2, American Chemical Society, Columbus, OH, Jul. 13, 1981, p. 282.

Chemical Abstracts, vol. 98, No. 22, American Chemical Society, Columbus, OH, Nov. 22, 1983, p. 312.

"Celite Products" World Minerals Corporation, internet article located at: http://www.worldminerals.com/celite.html, 2006, (1 pg.).

"Vermiculite Properties" The Vermiculite Association, internet article located at: http://www.vermiculite.org/properties.htm, printed Aug. 6, 2007, (3 pgs.).

Webster's II New Riverside University Dictionary, definition of "hollow" (1984) p. 587.

"Silica Fume," Cement Association of Canada, internet article located at: http://www.cement.ca/cement.nsf/ep/07669ADF88663915852568A9005A770?opendocument, printed Aug. 6, 2007 (2 pgs).

"Muscovite Mica and Phlogopite Mica" Reade Advanced Materials, internet article located at: http://www.reade.com/Products/Minerals_and_Ores/mica.html, printed Aug. 6, 2007, (3 pgs).

Litigation documents corresponding to Civil Case No. SCVSS115246. No. 5:04-CV-00674-RT-SGL, No. 04-C-1621, No. 05-CV-44, and No. A2-04-152.

Pawlowski, et al. "Novel Raw Material for Producing Heat Insulating Materials" Silikattechnik (1982) 33(11), 339-40 (abstract page).

Kolay, et al. "Physical, Chemical, Mineralogical, and Thermal Properties of Cenospheres from an Ash Lagoon" Dec. 29, 2000, pp. 539-542.

"What are Cenospheres" internet article located at: http://www.microspheres.co.za/contents.htm, printed Jul. 11, 2006, (5 pgs).

Gubka article "Composition and Morphology of Cenospheres" located at: http://www.atom.nw.ru/rie/projects/gubka/properties/cenospheres.shtml, printed Jul. 11, 2006, (2 pgs).

Drozhzhin, et al. "Technical Monitoring of Microspheres from Fly Ashes of Electric Power Stations in the Russian Federation" (undated) (8 pgs).

3M Material Safety Data Sheet, 3M™ Glass Bubbles, Types K and S, Apr. 10, 2006, pp. 1-7.

"Glass" Coming Glass Works—reprinted version of the Encyclopedia of chemical Technology (vol. 10) $2^{nd}$ ed. (pp. 542-543), 1955.

"Do You Need to Know About Eutectics to Make a Good Glaze?" Digital Fire Corporation, internet article located at: http://www.digitalfire.ab.ca/cermat/education/119.php?PHPSESSID=1e2d7f3f3a24698394ecae57ed3b06d5, Jul. 14, 2003, (4 pgs).

"Technology Education—Glass" Encyclopedia Britannica, internet article located at http://www.geocities.com/tech_ed_2000/industrial/manufacturing/glass/glass.htm?20... printed May 15, 2007, (4 pgs).

"Cenospheres—Hollow Ceramic Microspheres" Sphere Services, Inc., internet article located at: http://www.sphereservices.com/ceno.html, printed May 15, 2007, (2 pgs).

Third Party Observation filed on Aug. 23, 2006 by REDCO NV in EPO application No. 04700639.0-1218.

Opposition to EP-B-1330571 filed by REDCO on Dec. 15, 2006 (w/Translation).

Opposition to EP-B-1330571 filed by Saint-Gobain Materiaux on Jan. 19, 2007 (w/Translation).

\* cited by examiner

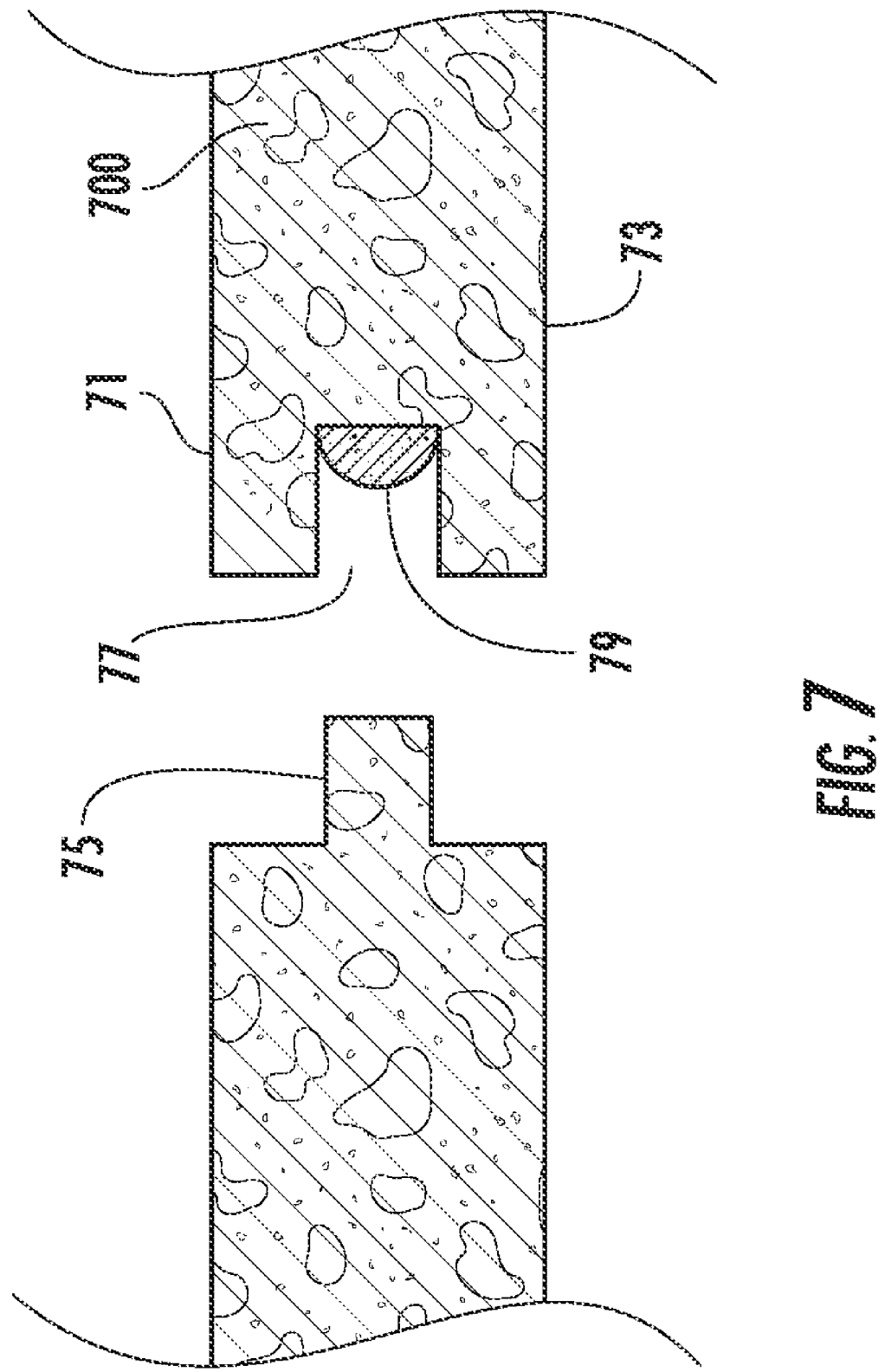

STRUCTURAL FIBER CEMENT BUILDING MATERIALS

BACKGROUND OF THE INVENTION

In residential construction, flooring for wet areas (bathrooms, kitchens, laundry rooms, etc.) typically involves first creating a "sub-floor", which is attached directly to the underlying support frame (studs and/or joists). The sub-floor typically consists of wood-based products such as particle board, press board, plywood, oriented strand board (OSB), or other such timber-based products.

In areas where tile is desired, it is common practice to attach underlayment (also known as backerboard) to the sub-floor and then affix tile on top of the underlayment. Having to haul, size, and install two materials prior to installing tile is time-consuming and increases labor costs. Also, given that the wood sub-floor is highly susceptible to water damage and lacks dimensional stability, fiber-reinforced cement (FRC) products such as water-resistant building sheets have been used as underlayments and are known in the art. Fiber-reinforced cement underlayments provide a moisture resistant barrier between the sub-floor and tile. However, if this waterproofing barrier is not installed correctly, water may penetrate through to the underlying sub-floor. The dimensional instability of the wood sub-floor could then disrupt the adhesion of the tiles to the underlayment or worse, the integrity of the underlying structure.

SUMMARY OF THE INVENTION

In one embodiment, there is provided a single floor grade composite fiber cement building material suitable for use in a variety of building applications, including wet area flooring. The single floor grade composite fiber cement building material may be secured directly to the floor joists, thus eliminating the need for installation of both a sub-floor and underlayment separately. Composite fiber cement building materials disclosed herein are lightweight, yet strong.

In accordance with one embodiment of the present invention, a fiber cement sheet is provided, which may be used as a waterproof single flooring grade fiber cement sheet in wet area flooring applications. The fiber cement sheet includes a cementitious matrix and reinforcing cellulose fibers distributed throughout the matrix. The fiber cement sheet has a dry density less than 1.25 $g/cm^3$, a thickness less than 0.7500 inch, and able to withstand uniform loads of at least 200 psf or greater according to test method of Section 6.4.2.4 of PS2 published by the US Department of Commerce and with an average deflection of less than 0.067 inches at 60 psf, able to withstand impact loads of 75 ft/lbs and a proof load of 400 pounds or greater following impact according to ASTM E 661 Procedure A with a deflection of less than 0.108 inches under a 200 pound load after impact, and able to withstand concentrated static loads of 550 pounds or greater according to ASTM E 661 with a deflection of less than 0.108 inches under a 200 pound load when spaced on a span of 24 inches or less on center. The fiber cement sheet is able to withstand uniform loads of at least 300 psf or greater with a deflection of less than 0.067 inches at 100 psf when spaced on a span of 24 inches on center or less when tested according to the test method of Section 6.4.2.4 of PS2.

In accordance with another embodiment of the present invention, a single floor sheet is provided which may include a hydraulic binder, aggregate, fibers, at least one low density additive, and additives. The hydraulic binder is in a range of about 25 to about 40 weight percent. The aggregate is in a range of about 30 to about 45 weight percent. The fibers are in the range of from about 10 to about 12 weight percent, preferably about 11 weight percent. At least one low density additive is in the range of from about 7 to about 12 weight percent. The single floor sheet has a dry density less than 1.25 $g/cm^3$, a thickness less than 0.7500 inches, and able to withstand uniform loads of 200 psf or greater according to test method of Section 6.4.2.4 of PS2 and with a deflection of less than 0.067 inches at 60 psf when spaced on a span of 24 inches on center or less.

In accordance with another embodiment of the present invention, a flooring system is provided which includes elongate horizontally-spaced supporting members each having an upper surface substantially coplanar, a waterproof single flooring grade fiber cement sheet disposed on top of and in direct contact with the upper surface of the supporting members, a layer of adhesive substantially covering the single flooring grade fiber cement sheet, and a floor covering adhered to the single flooring grade fiber cement sheet by the adhesive.

The flooring system may include multiple single flooring grade fiber cement sheet interlockingly engaged with one another by connectors. In certain embodiments, the connectors are tongue and groove joint respectively defined on opposite longitudinal edges of the single flooring grade fiber cement sheets.

In accordance with yet another embodiment of the present invention, a building sheet is provided which includes a top face, a bottom face, and two sets of opposing parallel edges. At least one edge contains a groove formed and the groove has a membrane situated inside encapsulating an adhesive. The membrane is configured to resist puncture during transport and prior to installation and configured to permit puncture upon sufficient contact with an edge of an adjacent building sheet during installation.

In accordance with yet another embodiment of the present invention, a wall system is provided which includes elongate vertically-spaced supporting members each having a surface substantially coplanar, and a waterproof fiber cement sheathing layer in contact with at least a portion of the surface of the supporting members, wherein the fiber cement sheathing layer has a dry density less than 1.25 $g/cm^3$ and able to endure racking shear testing and wind load test of the Acceptance Criteria (AC) 90 as set by the International Code Council Evaluation Services (ICC-ES).

Those skilled in the art will further appreciate the advantages and superior features of the invention mentioned above together with other important aspects upon reading the detailed description which follows in conjunction with the drawings, wherein:

BRIEF DESCRIPTION OF THE DRAWINGS

FIG. 7 is a cross-section view illustrating a flooring system with fiber cement sheets containing an adhesive membrane in the grove joint connector in accordance with the invention.

DETAILED DESCRIPTION OF PREFERRED EMBODIMENTS

Figure 1:
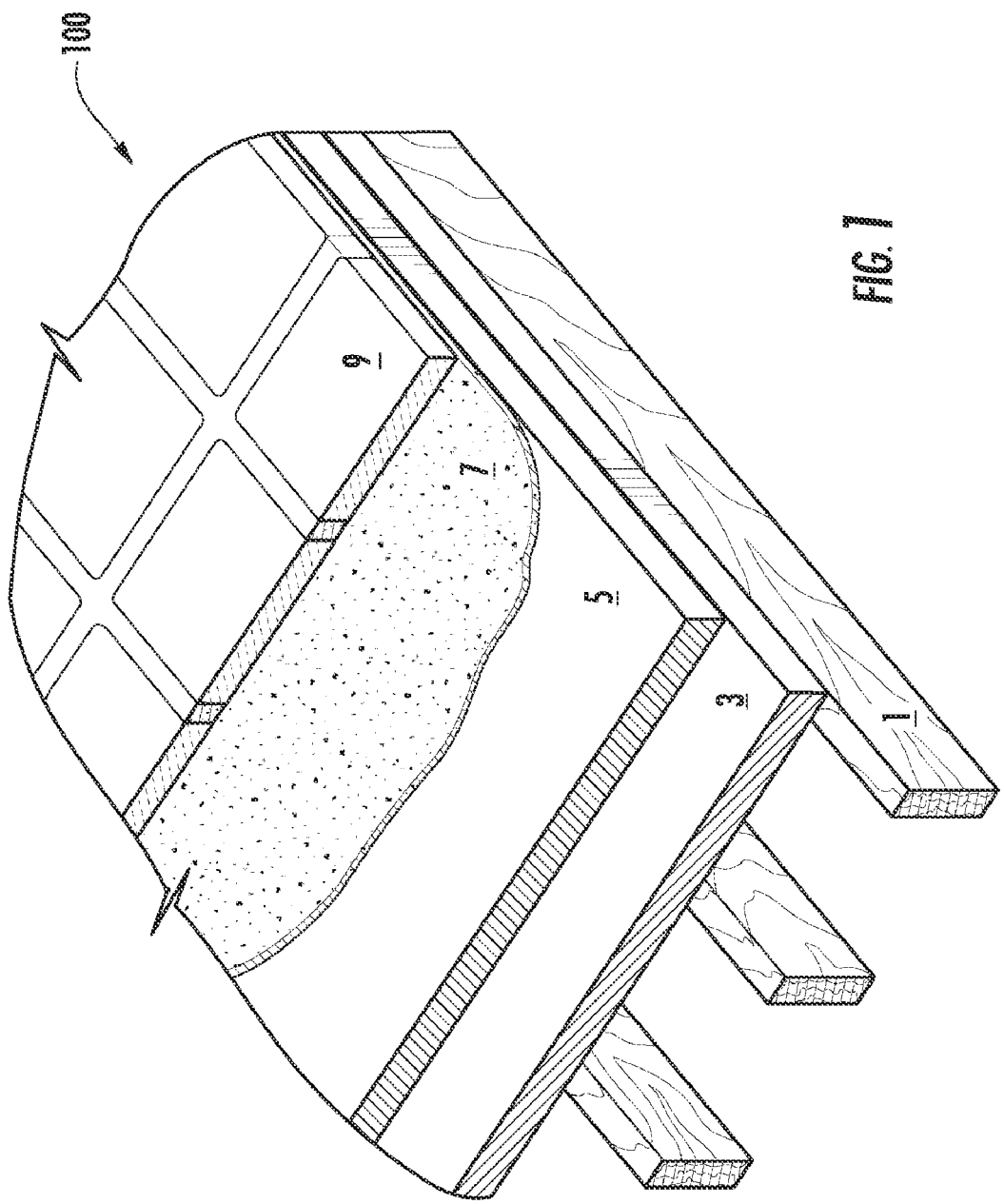
FIG. 1 is a perspective view of a prior art flooring system.

In the description that follows like parts are marked throughout the specification and drawings with the same reference numerals, respectively. The drawings figures may not necessarily be to scale and certain elements may be shown in generalized or somewhat schematic form in the interest of clarity and conciseness.

Referring to FIG. 1, there is illustrated a prior art flooring system generally designated by the numeral 100. Flooring system 100 is constructed of multiple flooring layers and is assembled by first constructing supporting members or floor joists 1, which generally consist of elongated beams spaced apart at equal distances and parallel to one another. Supporting members or floor joists 1 may be constructed of wood, steel or other suitable material. Attached to the top side of the supporting members or floor joists 1 is a wood-based sub-floor 3. The sub-floor 3 is generally flat and fastened to the upper-side of supporting members/floor joists 1 with suitable fasteners. Sub-floor 3 is formed of wood, such as plywood or oriented strand board (OSB). An underlayment 5 is then attached to the upper surface of the subfloor 3 by suitable fasteners, which may also include, additionally or alternatively, applying an adhesive. A layer of adhesive 7 is then spread on the top face of underlayment 5 and then tiles 9 are laid on top of underlayment 5 to complete the floor construction.

Figure 2:
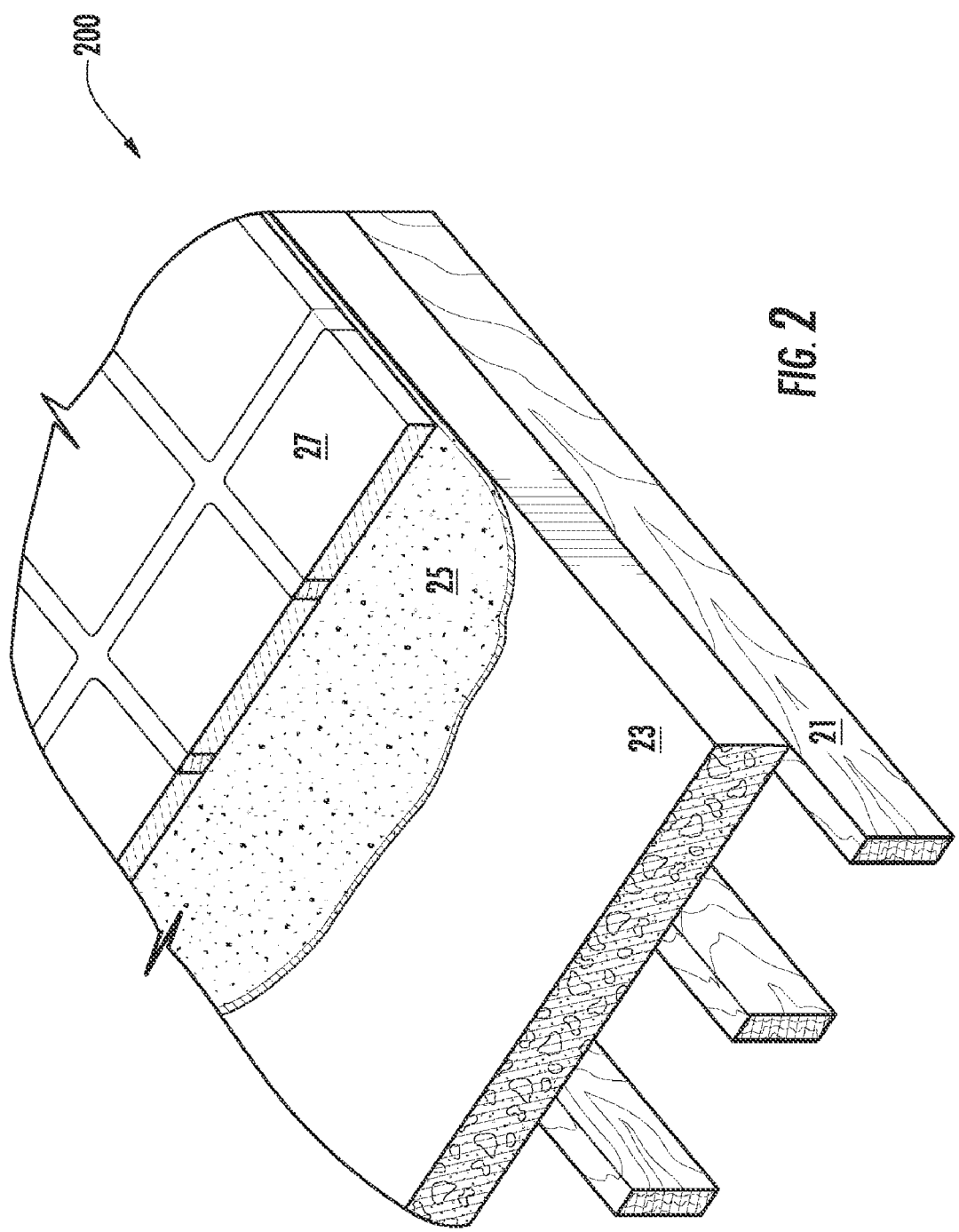
FIG. 2 is a perspective view of one embodiment of a flooring system in accordance with the invention.

Referring to FIG. 2, there is illustrated a flooring system in accordance with the invention and generally designated by the numeral 200. The flooring system 200 is adapted for flooring for use in "wet areas" such as for example, bathrooms, kitchens, and laundry rooms. The flooring system 200 is characterized by elongate horizontally-spaced supporting members 21, each having an upper surface substantially co-planar with the other supporting members 21. As will be appreciated from reviewing FIG. 2, the supporting members 21 run from wall to wall, wall to beam, or beam to beam, to support the floor. The supporting members 21 may be made of various suitable materials including wood, steel and concrete. One common supporting member 21 is a joist. In flooring construction, the joist is supported by an underlying beam in a repetitive fashion as is known in the art. The joists are typically spanned apart at 16 inches, 19.2 inches, or 24 inches on center.

Referring further to FIG. 2, the supporting members 21 directly support a single flooring grade cementitious sheet 23 in accordance with the present invention.

In certain embodiments, the single flooring grade cementitious sheet 23 may be a fiber cement sheet (described further below) in accordance with the present invention.

In one preferred embodiment of the present disclosure, sheets are specifically configured for use as structural flooring. In the construction industry, structural flooring is considered either sheathing grade or single floor grade. Sheathing grade flooring, also referred to as sub floor, requires an additional layer of flooring material such as underlayments, wood strip flooring, concrete topping, membranes, or other such functional flooring material prior to finishing with tiles. Single floor grade sheets do not require an additional functional layer. In one embodiment of the present disclosure, fiber cement sheets are engineered and configured as single floor grade. One advantage of the fiber cement single grade flooring sheets is that it does not require a tile underlayment to adhere tiles to the flooring. The disclosed embodiments alleviate the necessity of hauling, sizing, and installing two layers of flooring prior to installing tile. The fiber cement single grade flooring sheet is also water resistant, dimensionally stable, and is not susceptible to water damage.

Structural floors are required to meet certain standards. Fiber cement structural floors must be in compliance with the Acceptance Criteria For Fiber Cement Sheet Structural Floor Sheathing AC367 as set by the International Code Council Evaluation Services (ICC-ES). The structural floors must meet the minimum requirements for structural loads, which are concentrated static loads, impact loads, and uniform loads as well as the deflections with different loads.

Strength, however, is not the only consideration for a suitable flooring product. Not only should the flooring be strong, but have a high handleability. There is difficulty in making a flooring sheet that has a low density, is nailable, and has a thickness comparable to wood flooring sheets and overcomes the disadvantages of the wood flooring sheets. While fiber sheet composite products may be formulated (by adding material) to meet minimum strength requirements, the resulting sheets could easily be either too dense or too thick to be a viable product. When the flooring has too high a density, fastening of the flooring to the supporting members becomes difficult and pre-drilled holes are often be necessary to fasten the flooring to the supporting members easily. This would lead to increased cost to manufacture and reduce of ease of use. Also, if the density of the flooring sheet is high, the weight of the sheet increases. If the sheet is too heavy, it becomes difficult to carry, possibly requiring more than one person to handle and install the flooring. This is also a difficulty if the sheet is too thick. The sheet may become awkward and difficult to handle. There may be the possibility of requiring more than one person to handle and install the flooring. Further, if the flooring material is used only in wet areas and the material is thicker than conventional flooring materials, the flooring will be uneven from room to room.

Referring further to FIG. 2, a layer of adhesive 25 may be applied directly to the top surface of fiber cement sheet 23, substantially covering the fiber cement sheet 23. Thereafter, floor coverings such as tiles 27 are placed as desired on the fiber cement sheet 23, and are bonded to the fiber cement sheet 23 by adhesive 25. Suitable adhesives 25 include, but are not limited to, concrete mortars, dry-set Portland cement mortar, standard thin-set mortar, modified thin-set mortar, latex modified thin-set mortar, fortified thin-set mortar, polymer modified thin-set mortar, epoxy mortar, organic mastic, or any other suitable adhesive. Tiles may be ceramic, quarry, pavers, cement, porcelain, brick, precast terrazzo, natural stone, glass, or other material as are suitable in the art. It may be appreciated that the final flooring may not be limited to tile, but may include, for example, carpet, stone, masonry, vinyl, wood, laminate, or any other suitable floor finishing material. Such flooring materials may be attached using adhesive, staples, nails, tacks, etc.

The preferred embodiments of the present invention describe a fiber-reinforced cement formulation comprising a cementitious matrix and various components distributed throughout the matrix. The fiber-reinforced cement formulation of the present invention comprises a hydraulic binder, aggregates, reinforcing cellulose fibers, low density modifiers, and other additives. The formulation is optimized to provide a final fiber cement sheet product which has a dry density less than 1.25 g/cm$^3$ when formed at a thickness less than 0.7500 inch, able to withstand uniform peak loads at least 200 psf with an average deflection less than 0.067 inch at 60 psf, able to withstand impact loads of 75 ft/lbs and a proof load of 400 pounds or greater following impact according to ASTM E 661 Procedure A with a deflection of less than 0.108 inches under a 200 pound load after impact, and able to withstand concentrated static loads of 550 pounds or greater according to ASTM E 661 with a deflection of less than 0.108 inches under a 200 pound load when spaced on a span of 24 inches or less on center. The fiber cement sheet can actually withstand uniform peak loads of at least 300 psf with a deflection less than 0.067 inch at 100 psf when spaced on a span of 24 inches or less on center.

One preferred formulation of one embodiment of the present invention comprises a hydraulic binder, aggregate, reinforcing cellulose fibers, low density modifiers, and additives. The hydraulic binder is preferably Portland cement but can also be, and is not limited to, pulverized material in the solid, dry state which, when mixed with water, yields plastic mixtures that are able to set and harden. Examples of suitable hydraulic binders include but are not limited to, high alumina cement, ground granulated blast furnace slag cement, gypsum, magnesium phosphate cement, geo-polymer, or any other suitable material. The quantity of hydraulic binder in the formulation is preferably between about 10 to 60 wt % based on the total dry ingredients, more preferably about 20 to 45 wt % based on the total dry ingredients, and most preferably about 25 to 40 wt % based on the total dry ingredients.

The aggregate is preferably ground silica sand but can also be, and is not limited to, amorphous silica, silica fume, diatomaceous earth, rice hull ash, blast furnace slag, granulated slag, steel slag, mineral oxides, mineral hydroxides, clays, magnasite or dolomite, metal oxides and hydroxides, polymeric beads, or mixtures thereof. The quantity of the aggregate in the formulation is preferably between about 10 to 70 wt % based on the total dry ingredients, more preferably about 20 to 50 wt % based on the total dry ingredients, and most preferably about 30-45 wt % based on the total dry ingredients.

The reinforcing cellulose fibers preferably are thermomechanically or chemically-refined fibers, such as cellulose fibers produced by the Kraft process, which may be bleached or unbleached. Other forms of reinforcing fibers may also be used examples of which include, but are not limited to, ceramic fiber, glass fiber, mineral wool, steel fiber, and synthetic polymer fibers such as polyamides, polyester, polypropylene, polymethylpentene, polyacrylonitrile, polyacrylamide, viscose, nylon, PVC, PVA, rayon, glass ceramic, carbon, or any mixtures thereof. Useful reinforcing cellulose fibers may also include chemically treated cellulose fibers, such as fibers treated with hydrophobicity agents, biocides, etc. When cellulose fibers are used, they are preferably refined to a degree of freeness of between 20 and 800 Canadian Standard Freeness (CSF), more preferably 200 to 500 CSF. The reinforcing cellulose fibers may be present in a concentration of 9.5 to 12 wt % based on the weight of the dry formulation.

The low density additives (LDA) preferably are microspheres, but may include a variety of substances which assist in achieving lower density in the fiber cement substrate. Examples of suitable low density additives include, but are not limited to, microspheres, calsil, treated calsil, polymeric spheres, polymeric beads, polystyrene beads, expanded vermiculite, expanded perlite, expanded shale, expanded clay, or any other suitable material. One preferred low density additive is microspheres. The amount of low density additive in the formulation is preferably between about 7 to 12 wt %.

It should also be noted that additional additives can be optionally incorporated into the fiber cement formulation including but not limited to, fillers, dispersing agents, silica fume, geothermal silica, fire retardant, viscosity modifiers, thickeners, pigments, colorants, dispersants, foaming agents, flocculating agents, water-proofing agents, organic density modifiers, aluminum powder, kaolin, alumina trihydrate, mica, metakaolin, calcium carbonate, wollastonite, polymeric resin emulsions, hydrophobic agents, or mixtures thereof. Generally, these other additives may comprise between about 0-40 wt % of the total formulation.

The formulation may be formed into a green shaped article from a waterborne mixture or slurry by any number of suitable processes, such as the Hatschek sheet process, Magnani process, injection molding, extrusion, hand lay-up, molding, casting, filter pressing, flow on machine roll forming, etc., with or without post pressing. In certain embodiments, Hatschek sheet process is the preferred method, such process being described in Australian Patent No. 515151.

The product produced is preferably pre-cured (for about 12 hours) to establish the formulation to set and then cured by air-cure (approximately 28 days) or more preferably, by autoclaving (about 12 hours).

In certain embodiments, a sealant or sealant combination is applied to the fiber cement sheet. The sealant or sealant combination may be a polymer emulsion or solution and or a water repellent, such as, for example, silanes, siloxanes, waxes or stearates, to decrease the fiber cement sheet's water absorption in order to strengthen the sheet and promote its natural water resistant properties. The coating system may encompass air drying, multiple component systems, reactive chemical curing, thermo curing or radiation curing coatings (e.g., electron beam, ultra violet, near infra red, micro wave) or combinations utilizing any curing or drying techniques for water based, solvent based or 100% solids (wet or powder) coating systems.

Figure 3:
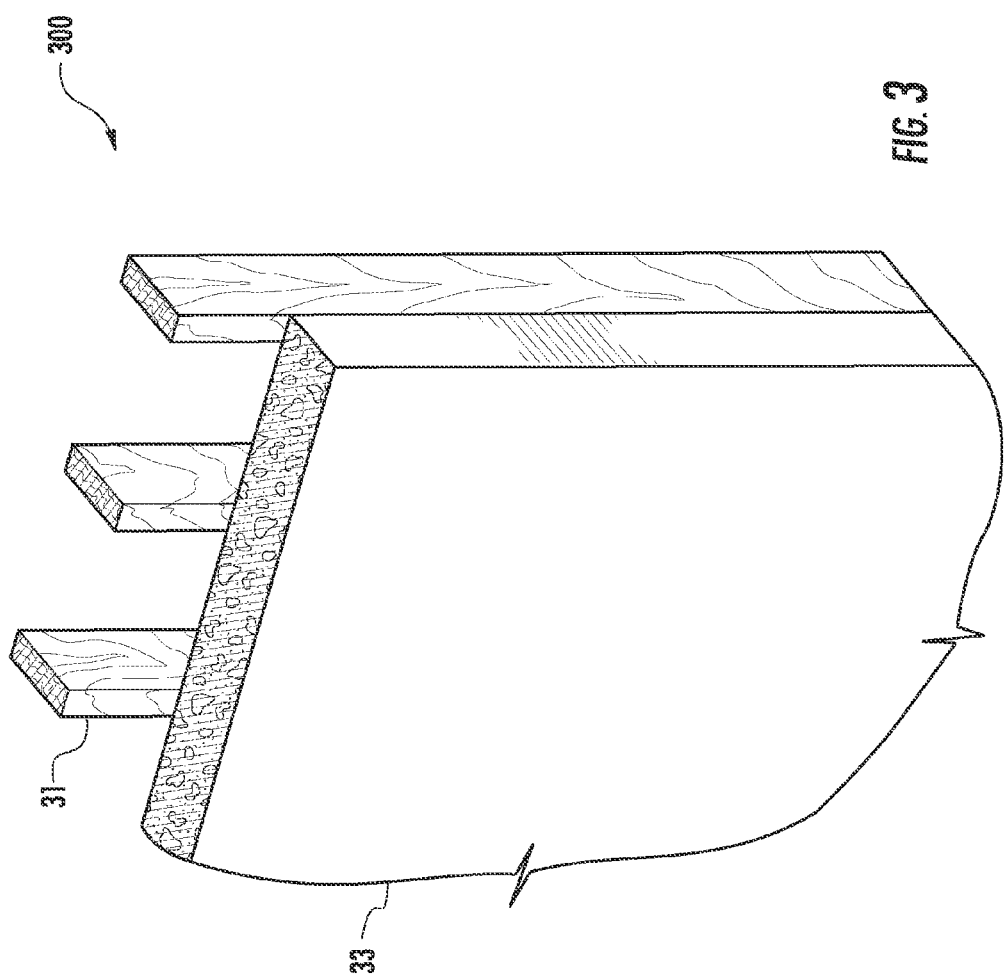
FIG. 3 is a perspective view of one embodiment of a wall system in accordance with the invention.

Turning to FIG. 3, there is illustrated a wall system in accordance with the invention and generally designated by the numeral 300. The wall system 300 is characterized by elongate vertically-spaced supporting members 31, each having a surface substantially co-planar with the other supporting members 31. As will be appreciated from reviewing FIG. 3, the supporting members 31 (commonly referred to as framing or "studs") run from floor to ceiling, floor to beam or beam to beam. The supporting members 31 may be made of various suitable materials including wood, steel, brick and concrete. The supporting members 31 are typically spanned apart at 16 inches or 24 inches on center.

In a preferred embodiment, the wall system comprises elongated supporting members having an outer surface substantially coplanar and a waterproof sheet on top of the outer surface of the supporting members. The supporting members run from floor to ceiling, flooring to beam or beam to beam. The supporting members may be made of wood, steel, brick, or concrete. Wall supporting members are commonly referred to as framing. The framing consists of studs, which are vertical framing member used to construct walls and partitions.

Referring further to FIG. 3, the supporting members 31 directly support one embodiment of a waterproof engineered fiber cement sheet 33 formed in accordance with the present invention as described above. The wall system 300 may be adapted for structural sheathing and may be designed to withstand racking shear and wind loading.

Figure 4:
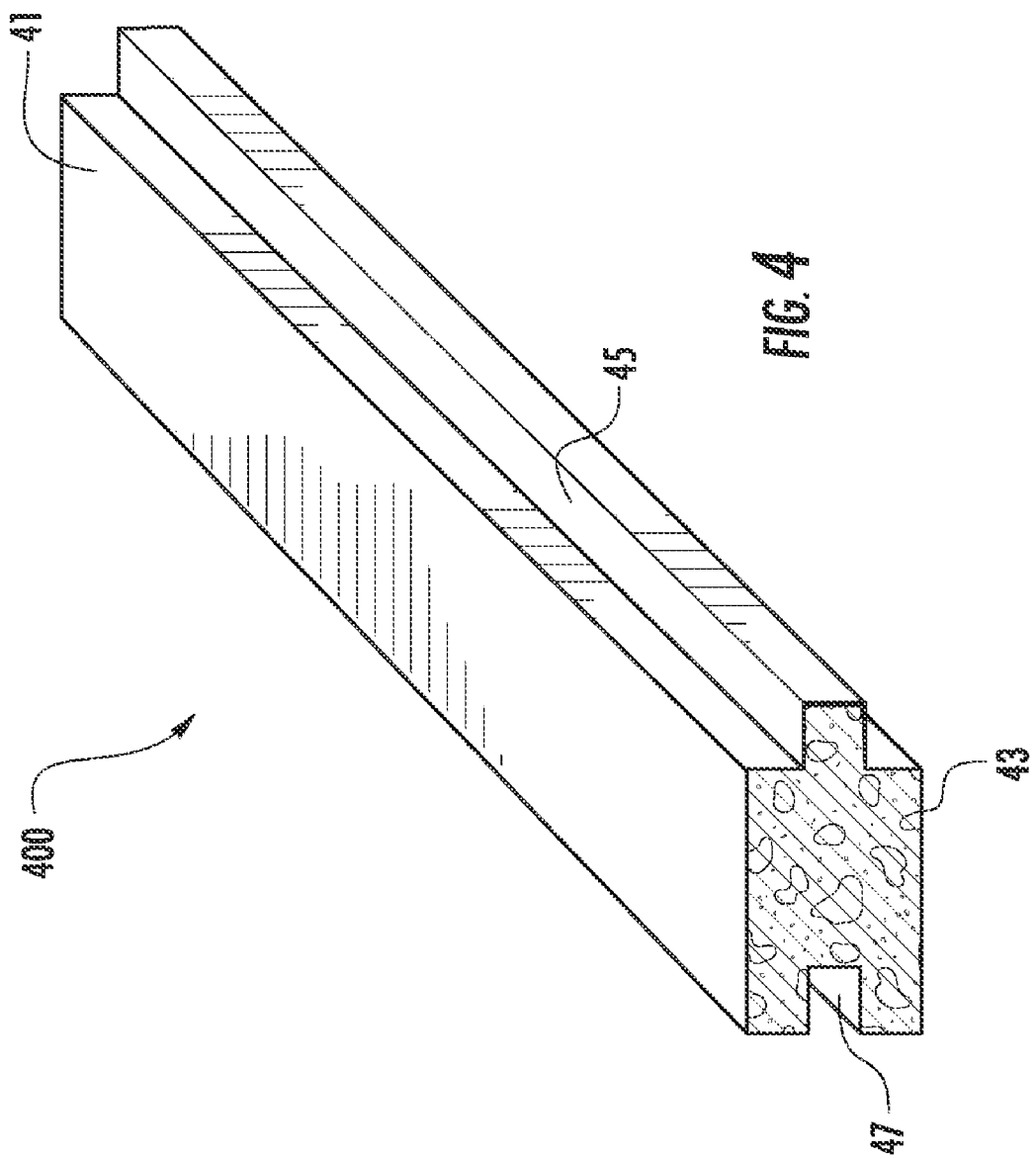
FIG. 4 is a perspective view illustrating a flooring system with a fiber cement sheet containing tongue and grove joint connectors in accordance with the invention.
Figure 5:
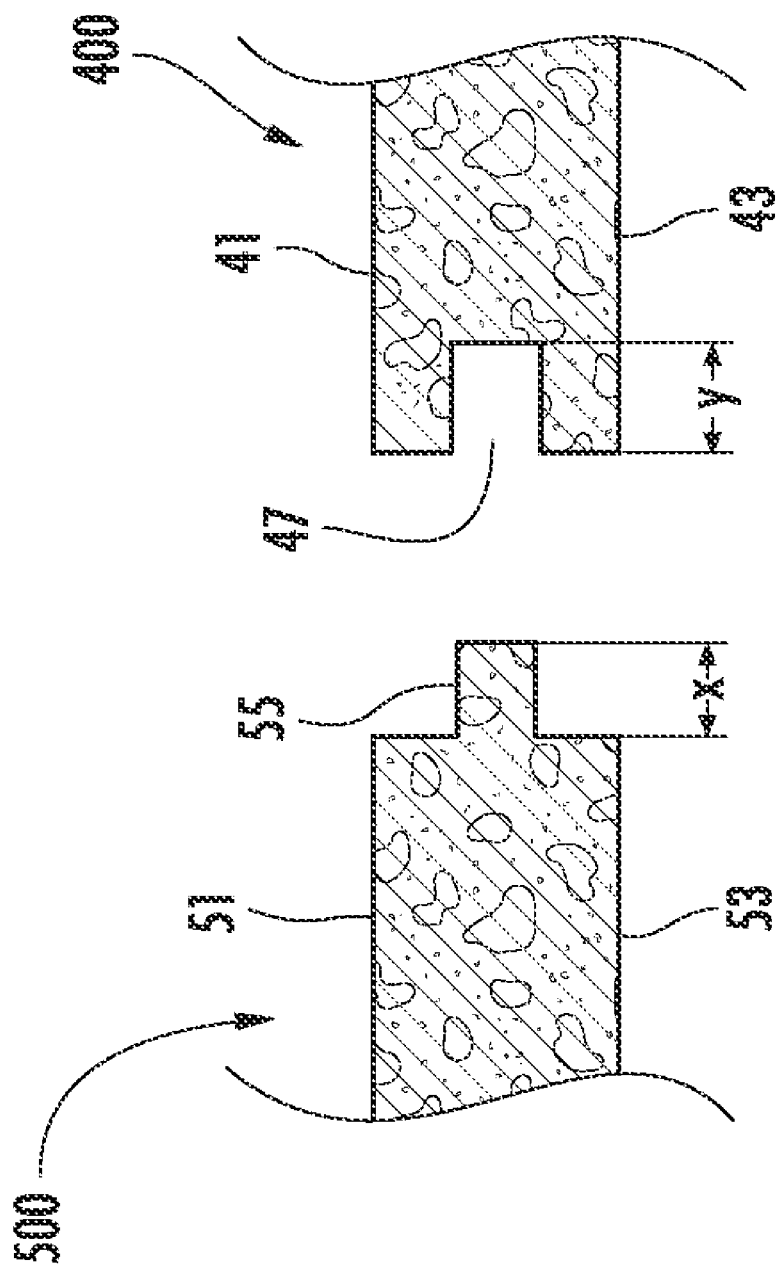
FIG. 5 is a cross-section view illustrating a flooring system with fiber cement sheets containing tongue and grove joint connectors in accordance with the invention.
Figure 6:
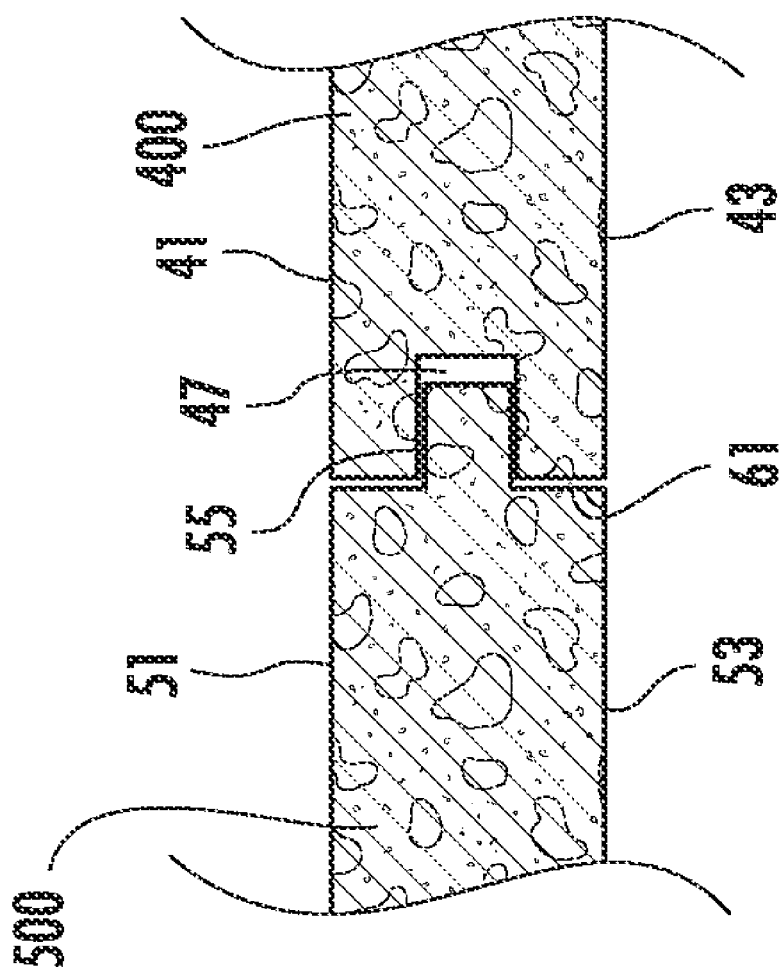
FIG. 6 is a cross-section view illustrating a flooring system with a plurality of fiber cement sheets interconnected using a tongue and groove joint to form a panel.

Referring to FIGS. 4-6, there is illustrated an engineered fiber cement sheet according to one embodiment of the present invention generally designated by the numeral 400. The fiber cement sheet 400 is characterized by a fiber cement sheet having a top face 41, a bottom face 43, and cooperating connections 45, 47 on longitudinally opposed edges. The connections serve to resist relative movement, and in particular co-planar misalignment, between abutting sheets along the joints. It will be appreciated by those skilled in the art that the connections may take many different forms. In FIG. 4, the connections take the form of tongue 45 and groove 47 formations defined on opposite longitudinal edges of the sheets.

Turning to FIG. 5, connections permit the sheet 400 to be interlockingly engaged with an adjacent complementary sheet, generally designated by the numeral 500. The adjacent complementary sheet 500 is characterized as having a top face 51, a bottom face 53, and connections, which as shown in FIG. 5, take the form of tongue 55 and groove (not shown) formations defined on opposite longitudinal edges of the complementary sheet. Tongue 55 generally extends from the main body of the sheet 500 and has a length "x", which is preferably in the range of 0.01 to about 3 inches. Complementary sheet 500 may be interlockingly engaged with the corresponding groove 47 of adjacent sheet 400, having a length "y", preferably in the range of 0.01 to about 3 inches.

Sheet 400 and complementary sheet 500 may be interlockingly engaged to form a coplanar support surface, as shown in FIG. 6.

Referring still to FIG. 5, when a tongue and groove of adjoining sheets are interlocked, using the sheets 400 and 500 as examples, it is preferable that the length "x" of tongue 55 of the complementary sheet 500 be slightly shorter than the length "y" of complementary grove 47 of sheet 400, such that a cavity 61 (see FIG. 6) is created to allow for glue or adhesive to be inserted. One of skill in the art will also appreciate that the height of tongue 55 may be slightly smaller than the height of grove 47, so as to provide further cavities in which glue/adhesive may be inserted. The glue/adhesive acts to bond the connection and/or seal the connection to moisture as required for waterproofing wet areas such as bathroom floors.

The adjacent complementary sheet 500 may be formed from any material having complementary connections, such as a further fiber cement sheet, a sheet of particle board, OSB or any other suitable sheet.

While the embodiments shown in the accompanying figures illustrate connections having square or rectangular geometries, it will be appreciated that the cooperating tongues and grooves may take any desired shape, and are not limited to the exemplary geometries given. Examples of suitable connections useful in fiber cement sheets of the present invention include, but are not limited to, biscuit join, bridle, butt, butterfly, dowel, coping, cope and stick, dado, dovetail, finger, lap, miter, mortise and tenon, pocket-hole, rabbet, scarf, splice joint, tongue and groove, frame and panel, or any other suitable connectors. In certain embodiments, tongue and groove is the preferred connections. The connections may be formed on the board by any suitable process, such as by extrusion during the sheet formation process, or by machining once sufficient curing has taken place. Other suitable methods of forming the connections will be readily apparent to those skilled in the art.

In one embodiment, a fiber reinforced cement sheet is connected to an adjacent sheet of the same material. In another embodiment, a fiber reinforced cement sheet may be connected to an adjacent sheet comprising any suitable construction material, such as oriented strand board, plywood, etc. Standard plywood and OSB for flooring typically have a tongue and groove joint. The fiber cement sheet may be configured with a tongue and groove joint to align and lock with the tongue and groove joint of wood flooring. This is particularly useful when the fiber cement flooring sheet is used only in wet areas, such as bathrooms, and wood flooring is used in an adjacent room, such as a bedroom.

Turning to FIG. 7, there is illustrated an engineered fiber sheet according to one embodiment of the present invention generally designated by the numeral 700. The fiber cement sheet 700 is characterized by a fiber cement sheet having a top face 71, a bottom face 73, and connections 75, 77 which take the form of tongue 75 and groove 77 on opposite longitudinal edges. In FIG. 7, a membrane 79 filled with adhesive is shown situated in the groove 77. The membrane 79 is configured such that it breaks and releases adhesive when the tongue 75 of one sheet is inserted in the groove 77 of a complementary sheet. Once the membrane 79 is broken, adhesive flows out of the membrane and into the cavity of the joint. The adhesive then substantially fills the cavity and adheres the sheets together.

Membrane 79 is configured to encapsulate an adhesive and to resist puncture and/or breakage during transport and prior to installation. Membrane 79 is also configured to permit puncture and breakage upon sufficient contact with an edge of an adjacent building material upon installation. Preferably, membrane 79 is configured in such a way such that the membrane is punctured after a majority of the tongue portion of a complementary building sheet is inserted into the groove-containing membrane during installation.

Examples of suitable membrane materials include, but are not limited to, polyethylene, polypropylene, polyester, poly acrylate, nylon, polyvinylalcohol, biaxially oriented polypropylene, polyethylene terephthalate, polyurethane, polyamide, polyacrylic, fluoropolymer films, acrylic, or any other suitable material. In certain embodiments, the membrane is constructed of polyethylene. Membranes useful in the present invention may be prepared in various forms including flat sheets, tubes, capillaries and hollow fibers. Membranes useful in the present invention may be built in membrane systems like plate and frame, spiral-wound module, hollow fiber module, and tube-in-shell module. The membrane may be placed in the groove of the engineered fiber cement sheet during the forming of the membrane. Further the membrane may be formed during manufacture of the fiber cement sheet or installed after the fiber cement sheet has been formed.

The membrane 79 may be substantially filled with an adhesive. Suitable adhesive include, but are not limited to, polyacrylate, polyvinyl ether, polyvinyl acetate, rubber (e.g., natural rubber), polyisoprene, polychloroprene, butyl rubber, neoprene rubber, ethylene propylene diene rubber (EPDM), polyisobutylene, butadiene-acrylonitrile polymer, thermoplastic elastomers, styrene-butadiene rubber, poly-alpha-olefins, amorphous polyolefins, silicones, ethylene-containing copolymers (e.g., ethylene-acrylic acid, ethylene vinyl acetate, ethylene ethyl acrylate, ethylene n-butyl acrylate, and ethylene methyl acrylate), polyurethanes, polyamides, epoxys, polyvinylpyrrolidone and polyvinylpyrrolidone copolymers, polyesters, and mixtures or copolymers thereof. The membrane substantially filled with adhesive may be formed by suitable methods, such as, for example, extrusion, pultrusion, injection, blowing, and casting. The membrane may be formed as one piece or as multiple pieces.

EXAMPLES

The following examples are presented to further illustrate embodiments of the present invention and are not to be construed as unduly limiting the scope.

Structural floors are required to meet certain standards. In the US, fiber cement structural floors must be in compliance with the Acceptance Criteria For Fiber Cement Sheet Structural Floor Sheathing AC367 as set by the International Code Council Evaluation Services (ICC-ES). The acceptance criteria sets the minimum values for various properties, including structural loads, deflection under load, flexural strength, moisture movement, moisture content, water tightness, warm water resistance, shear bond strength, nail-head pull through, and fastener holding. As described further below, tests were conducted to ascertain the strength of exemplary fiber cement sheets, as compared to other formulations. The structural loads are concentrated static loads, impact loads, and uniform loads. The flooring must meet the minimum requirements of all three load tests and deflections to be considered structural flooring.

Example I

TABLES 1 and 2 below illustrate example fiber reinforced cement formulations of the present invention (Table 1) and test results for these formulations (Table 2), more particularly, demonstrating the strength of the product as it relates to the product's ability to withstand concentrated or static loads. About 500 sheets of flooring were manufactured to the product requirement specification and tested for strength criteria.

TABLE 1

FORMULATIONS FOR TABLE 2 RESULTS

| Formula | Portland Cement | Silica Aggregate | Cellulose Fiber | Additive | Low Density Additive Microspheres | Calsil |
|---|---|---|---|---|---|---|
| 1 | 36 | 39.75 | 11.25 | 3 | 10 | 0 |

TABLE 2 shows the requirements of concentrated static load based on the criteria for fiber reinforced cement single floor grade sheets. The fiber cement sheets with formulation 1 were tested in accordance with ASTM E661, and were tested dry, and wet/redry (exposed to three days of continuous wetting, followed by performing the test with re-dry samples). Two criteria were tested: (1) ability to withstand a minimum static peak load of 550 lbs under either dry or wet/redry condition at 16 inch, 20 inch, or 24 inch spans on centers, and (2) maximum deflection under 200 lbs of load (0.108 inch at 24 inch spans on center).

TABLE 2

CONCENTRATED STATIC LOAD TEST PERFORMANCE FOR PRODUCT FORMULATION 1 AS COMPARED TO CONCENTRATED STATIC LOAD TEST PERFORMANCE CRITERIA FOR SINGLE FLOOR GRADE SHEETS

| Span Rating (in) | Conditions at test | PERFORMANCE REQUIREMENT Static (Minimum Peak Load, lbs) | TEST RESULT Static (Minimum Peak Load, lbs) | PERFORMANCE REQUIREMENT Maximum Deflection (in) under 200-pound Load | TEST RESULT Maximum Deflection (in) under 200-pound Load |
|---|---|---|---|---|---|
| 24 | Dry | 550 | 880-1005 | 0.108 | 0.035-0.070 |
|  | Wet/redry | 550 | 900-1100 | 0.108 | 0.045-0.065 |

Example II

TABLE 3 below illustrates fiber reinforced cement formulations and test results for these formulations, more particularly, demonstrating the effects of increased amounts of low density additives

TABLE 3

FORMULATIONS HAVING INCREASED AMOUNTS OF LOW DENSITY ADDITIVES AND EFFECTS ON CONCENTRATED STATIC LOAD TEST PERFORMANCE

| Form. | Portland Cement | Silica Aggregate | Cellulose Fiber | Additive | LDA Microspheres | Calsil | Static Load | Deflection |
|---|---|---|---|---|---|---|---|---|
| 1 | 36 | 39.75 | 11.25 | 3 | 10 | 0 | 880 | 0.035 |
| 4 | 43.2 | 28.8 | 11.0 | 2 | 10 | 5 | 685 | 0.19 |
| 5 | 37.2 | 24.8 | 11.0 | 2 | 25 | 0 | 560 | 0.30 |

In TABLE 3, formulation 1 with 10% LDA exceeded the minimum requirements for strength and deflection to comply with AC 367. Formulations 4 and 5, with increased amounts of LDA, (15% and 25%, respectively) would lower the densities of the fiber cement sheet to improve nailability. However, the products having formulations 4 and 5 did not meet the minimum standards for deflections under load after concentrated static load testing, as the deflections for formulations 4 and 5 (0.19 and 0.30) were above the minimum standard of 0.108 inch under 200 lbs of load.

Example III

TABLE 4 below illustrates fiber reinforced cement formulations and test results for these formulations, more particularly, demonstrating the effects of decreased amounts of low density modifiers.

TABLE 4

FORMULATIONS HAVING DECREASED AMOUNTS OF LOW DENSITY ADDITIVES AND EFFECTS ON CONCENTRATED STATIC LOAD TEST PERFORMANCE

| Form. | Portland Cement | Silica Aggregate | Cellulose Fiber | Additive | LDA Microspheres | Calsil | Static Load | Deflection |
|---|---|---|---|---|---|---|---|---|
| 1 | 36 | 39.75 | 11.25 | 3 | 10 | 0 | 880 | 0.035 |
| 3 | 46.8 | 31.2 | 11.0 | 2 | 0 | 9 | 800 | 0.21 |

In TABLE 4, formulation 1 with 10% LDA exceeded the minimum requirements for strength and deflection to comply with AC 367. Formulation 3, with a decreased amount of LDA (9%) resulted in a product that would not be strong enough to meet minimum testing requirements, given that the deflections under load were well above the minimum standard of 0.108 in under 200 lbs of load.

Example IV

TABLE 5 shows the requirements of impact load based on the criteria for fiber reinforced cement single floor grade sheets. The fiber cement sheets with formulation 1 (prepared in accordance with the method described in EXAMPLE 1) were tested in accordance with ASTM E661, Procedure A, using a 75 ft-lbf impact for span rating up to 24 inches on center, and were tested dry, and wet/redry (exposed to three days of continuous wetting, followed by performing the test with re-dry samples). 3 criteria were tested: (1) ability to withstand a 75 ft/lbs impact (2) ability to withstand a minimum proof load of 400 lbs following the impact under either dry or wet/redry conditions at 24 inch spans on centers or less, and (2) maximum deflection under 200 lbs of load after impact (0.108 inch at 24 inch spans on center). The fiber cement sheet of formulation 1 were able to withstand at least 120 ft/lbs impact.

TABLE 5

IMPACT LOAD TEST PERFORMANCE FOR PRODUCT FORMULATION 1 AS COMPARED TO IMPACT LOAD TEST PERFORMANCE CRITERIA FOR SINGLE FLOOR GRADE SHEETS

| Span Rating (in) | Conditions at test | PERFORMANCE REQUIREMENT Impact (Minimum Peak Load, lbs) | TEST RESULT Impact[1] (Minimum Peak Load, lbs) | PERFORMANCE REQUIREMENT Maximum Deflection (in) under 200-pound Load | TEST RESULT Maximum Deflection (in) under 200-pound Load |
|---|---|---|---|---|---|
| 24 | Dry | 400 | 400 | 0.108 | 0.030-0.070 |
|  | Wet/redry | 400 | 400 | 0.108 | 0.030-0.065 |

[1]The standard test requires withstanding a 75 ft-lbf impact. The test samples were able to withstand at least a 120 ft-lbf impact.

Example V

TABLE 6 illustrates test results of fiber reinforced cement formulations and test results for these formulations, more particularly, demonstrating the effects of decreased amounts of fibers and increased amounts of low density additives.

TABLE 6

FORMULATIONS HAVING DECREASED AMOUNTS OF FIBERS AND INCREASED AMOUNTS OF LOW DENSITY ADDITIVES AND EFFECTS ON IMPACT LOAD TEST PERFORMANCE

| Form. | Portland Cement | Silica Aggregate | Cellulose Fiber | Additive | LDA Microspheres | Calsil | Impact Load | Deflection |
|---|---|---|---|---|---|---|---|---|
| 1 | 36 | 39.75 | 11.25 | 3 | 10 | 0 | 400 | 0.030 |
| 2 | 38.9 | 25.35 | 9.75 | 3 | 23 | 0 | 400 | 0.118 |

In TABLE 6, formulation 1 with 10% LDA and 11.25% fibers exceeded the minimum requirements for impact and deflection to comply with AC 367. Formulation 2, with an increased amount of LDA (23%) and decreased amount of fibers (9.75%) resulted in a product that would not be strong enough to meet minimum testing requirements, given that the deflections under load were well above the minimum standard of 0.108 in under 200 lbs of load.

Example VI

TABLE 7 illustrates test results of fiber reinforced cement formulations of the present invention, more particularly, demonstrating the strength of the product as it relates to the product's ability to withstand uniform loads.

TABLE 7 shows the requirements of uniform load based on the criteria for fiber reinforced cement single floor grade sheets. The fiber cement sheets with formulation 1 (prepared in accordance with the method described in EXAMPLE 1) were tested in accordance with Sections 6.4.2.2 and 6.4.2.3 of PS2 published by the U.S. Department of Commerce and tested in accordance with a modified test method of Section 6.4.2.4 of PS2. The test was modified such that the specimens were loaded at a uniform rate of 50 lb/ft² per minute and deflections measured at loading intervals of 20 lb/ft². The specimens were tested dry, and wet/redry (exposed to three days of continuous wetting, followed by performing the test with re-dry samples). 2 criteria were tested: (1) ability to withstand a minimum peak uniform load of 200 psf under either dry or wet/redry conditions at 24 inch spans on centers, and (2) maximum average deflection (0.067 at 60 psf).

TABLE 7

UNIFORM LOAD TEST PERFORMANCE FOR PRODUCT FORMULATION 1 AS COMPARED TO UNIFORM LOAD TEST PERFORMANCE CRITERIA FOR SINGLE FLOOR GRADE AND SHEATHING GRADE SHEETS

| Span Rating (in) | Conditions at test | PERFORMANCE REQUIREMENT Uniform Load(Peak Load, psf) | TEST RESULT Uniform Load(Peak Load, psf) | PERFORMANCE REQUIREMENT Average deflection under Load | TEST RESULT Average deflection under Load |
|---|---|---|---|---|---|
| 24 | Dry | 200 | 320-390 | 0.067 at 60 psf | 0.025-0.035 |
|  | Wet/redry |  |  |  | 0.025-0.055 |

As the above examples demonstrate, formulation 1 met and exceeded the requirements of structural flooring for strength and deflection. At spans of 24 inches on center, the specimens surpassed the minimum thresholds by at least 30%.

It is the appropriate ratio of raw materials that impart the necessary strengths to meet the structural load and deflection requirements while maintaining the appropriate density and thickness. The ratio of the raw materials of cement, silica, fibers, low density modifiers, and additives all have an effect on the finished fiber cement sheet. It is a very narrow range of the raw materials that supply the engineered fiber cement with the necessary strength and handleability to be considered structural flooring.

Although the foregoing description of the preferred embodiments has shown, described and pointed out certain novel features of the invention, it will be understood that various omissions, substitutions, and changes in the form of the detail as illustrated as well as the uses thereof, may be made by those skilled in the art, without departing from the scope of the invention. Particularly, it will be appreciated that the preferred embodiments may manifest itself in other shapes and configurations as appropriate for the end use of the article made thereby.

What is claimed is:

1. A fiber cement sheet comprising:
cementitious matrix,
reinforcing cellulose fibers distributed throughout the matrix, said reinforcing cellulose fibers comprise about 10% to 12% by weight,
a low density additive, said low density additive comprising about 7% to 12% by weight,
wherein the fiber cement sheet has a dry density less than 1.25 g/cm³, a thickness less than 0.7500 inches, and
able to withstand uniform loads of 200 psf or greater and with an average deflection of less than 0.067 inches at 60 psf,
able to withstand impact loads of 75 ft/lbs and a proof load of 400 pounds or greater following impact with a deflection of less than 0.108 inches under a 200 pound load after impact,
and
able to withstand concentrated static loads of 550 pounds or greater with a deflection of less than 0.108 inches under a 200 pound load
when spaced on a span of 24 inches or less on center.

2. The fiber cement sheet of claim 1, wherein the low density additive is selected from the group consisting of microspheres, calsil, treated calsil, polymeric beads, polystyrene beads, expanded vermiculite, expanded perlite, expanded shale, expanded clay, and the like and combinations thereof.

3. The fiber cement sheet of claim 2, wherein the reinforcing cellulose fibers are present in an amount of about 11% by weight.

4. The fiber cement sheet of claim 1, wherein the cementitious matrix comprises a hydraulic binder in an amount in the range of from about 25 to about 40 weight percent.

5. The fiber cement sheet of claim 4, wherein the hydraulic binder is Portland cement.

6. The fiber cement sheet of claim 1, further comprising an aggregate distributed throughout the matrix, wherein the aggregate is selected from the group consisting of ground silica, amorphous silica, silica fume, diatomaceous earth, rice hull ash, blast furnace slag, granulated slag, steel slag, mineral oxides, mineral hydroxides, clays, magnasite, dolomite, metal oxides, metal hydroxides, polymeric beads, and the like and mixtures thereof.

7. The fiber cement sheet of claim 6, wherein the aggregate is present in an amount in the range of from about 30 to about 45% by weight.

* * * * *